United States Patent
Shimauchi et al.

(10) Patent No.: US 9,852,521 B2
(45) Date of Patent: *Dec. 26, 2017

(54) IMAGE CODING DEVICE, IMAGE DECODING DEVICE, METHODS THEREOF, AND PROGRAMS

(71) Applicant: Sony Corporation, Tokyo (JP)

(72) Inventors: Kazuhiro Shimauchi, Tokyo (JP); Yuji Wada, Tokyo (JP); Hiroshi Ikeda, Kanagawa (JP); Daisuke Tahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/808,554

(22) Filed: Jul. 24, 2015

(65) Prior Publication Data

US 2015/0334406 A1    Nov. 19, 2015

Related U.S. Application Data

(63) Continuation of application No. 13/968,088, filed on Aug. 15, 2013, now Pat. No. 9,153,041, which is a (Continued)

(30) Foreign Application Priority Data

Feb. 10, 2011   (JP) .................. 2011-027385

(51) Int. Cl.
  *G06K 9/36*   (2006.01)
  *G06T 9/00*   (2006.01)
  (Continued)

(52) U.S. Cl.
  CPC .............. *G06T 9/007* (2013.01); *G06T 9/004* (2013.01); *H04N 19/103* (2014.11);
  (Continued)

(58) Field of Classification Search
  CPC .... G06T 9/007; H04N 19/119; H04N 19/122; H04N 19/14; H04N 19/176
  See application file for complete search history.

(56) References Cited

U.S. PATENT DOCUMENTS

| 6,025,881 A | 2/2000 | Kikuchi et al. |
| 6,069,980 A | 5/2000 | Honda |

(Continued)

FOREIGN PATENT DOCUMENTS

| JP | 4-277982 | 10/1992 |
| JP | 09-065341 | 3/1997 |

(Continued)

OTHER PUBLICATIONS

Farrelle, Paul Michael. "Adaptive Coding Based on Quad Tree Segmentation." Recursive Block Coding for Image Data Compression. Springer New York, 1990. 191-224.*

(Continued)

*Primary Examiner* — Li Liu
(74) *Attorney, Agent, or Firm* — Oblon, McClelland, Maier & Neustadt, L.L.P.

(57) ABSTRACT

An image coding device including: an edge detecting section configured to perform edge detection using an image signal of a reference image for a coding object block; a transform block setting section configured to set transform blocks by dividing the coding object block such that a boundary between the blocks after division does not include an edge on a basis of a result of the edge detection; and a coding processing section configured to generate coded data by performing processing including an orthogonal transform of each of the transform blocks.

17 Claims, 29 Drawing Sheets

Related U.S. Application Data continuation of application No. 13/347,982, filed on Jan. 11, 2012, now Pat. No. 8,538,179.

(51) Int. Cl.
| | |
|---|---|
| *H04N 19/176* | (2014.01) |
| *H04N 19/70* | (2014.01) |
| *H04N 19/119* | (2014.01) |
| *H04N 19/46* | (2014.01) |
| *H04N 19/122* | (2014.01) |
| *H04N 19/61* | (2014.01) |
| *H04N 19/103* | (2014.01) |
| *H04N 19/126* | (2014.01) |
| *H04N 19/14* | (2014.01) |

(52) U.S. Cl.
CPC ......... *H04N 19/119* (2014.11); *H04N 19/122* (2014.11); *H04N 19/126* (2014.11); *H04N 19/14* (2014.11); *H04N 19/176* (2014.11); *H04N 19/46* (2014.11); *H04N 19/61* (2014.11); *H04N 19/70* (2014.11)

(56) References Cited

U.S. PATENT DOCUMENTS

| | | |
|---|---|---|
| 2003/0007183 A1 | 1/2003 | Ishiguro |
| 2007/0002945 A1 | 1/2007 | Kim |
| 2010/0118959 A1 | 5/2010 | Lou et al. |
| 2010/0128995 A1 | 5/2010 | Drugeon et al. |
| 2011/0047155 A1 | 2/2011 | Sohn et al. |
| 2011/0135006 A1 | 6/2011 | Yamamoto et al. |
| 2011/0188574 A1 | 8/2011 | Matsuo et al. |
| 2011/0222792 A1 | 9/2011 | Kusakabe |
| 2011/0292998 A1 | 12/2011 | Ohgose et al. |
| 2013/0028530 A1 | 1/2013 | Drugeon et al. |

FOREIGN PATENT DOCUMENTS

| | | |
|---|---|---|
| JP | 10-126775 | 5/1998 |
| JP | 2009-272727 | 11/2009 |

OTHER PUBLICATIONS

Bharanitharan, K., An Chao Tsai, "Efficient Block Size Decision Algorithm for Intra Mode Decision in H.264/AVC Encoder", 11th IEEE International Symposium on Multimedia, 2009.

Byeongdu La; Minyoung Eom; Yoonsik Choe, "Fast Mode Decision for Intra Prediction in H.264/AVC Encoder", IEEE International Conference on Image Processing, 2007. ICIP 2007.

Sungmin Kim; Takgi Lee; Kidong Chung, "An Efficient and Fast Block Size Decision Exploiting Boundary Information on Inner Block for H.264/AVC Intra Prediction", IEEE Southwest Symposium on Image Analysis and Interpretation, 2008.

Yi-Hsin Huang; Tao-Sheng Ou; Chen, H.H., "Fast Decision of Block Size, Prediction Mode, and Intra Block for H.264 Intra Prediction", IEEE Transactions on Circuits and Systems for Video Technology, Aug. 2010.

Japanese Office Action dated Mar. 10, 2015 in Japanese Application No. 2011-027385.

Japanese Office Action issued on Nov. 11, 2014 in Japanese Application No. 2011-027385.

Japanese Office Action dated Jun. 30, 2015 in Japanese Application No. 2011-027385.

\* cited by examiner

FIG.9

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

PREDICTION MODE 0
(vertical)

PREDICTION MODE 1
(horizontal)

PREDICTION MODE 2
(DC)

PREDICTION MODE 3
(diagonal down-left)

PREDICTION MODE 4
(diagonal down-right)

PREDICTION MODE 5
(vertical-right)

PREDICTION MODE 6
(horizontal-down)

PREDICTION MODE 7
(vertical-left)

PREDICTION MODE 8
(horizontal-up)

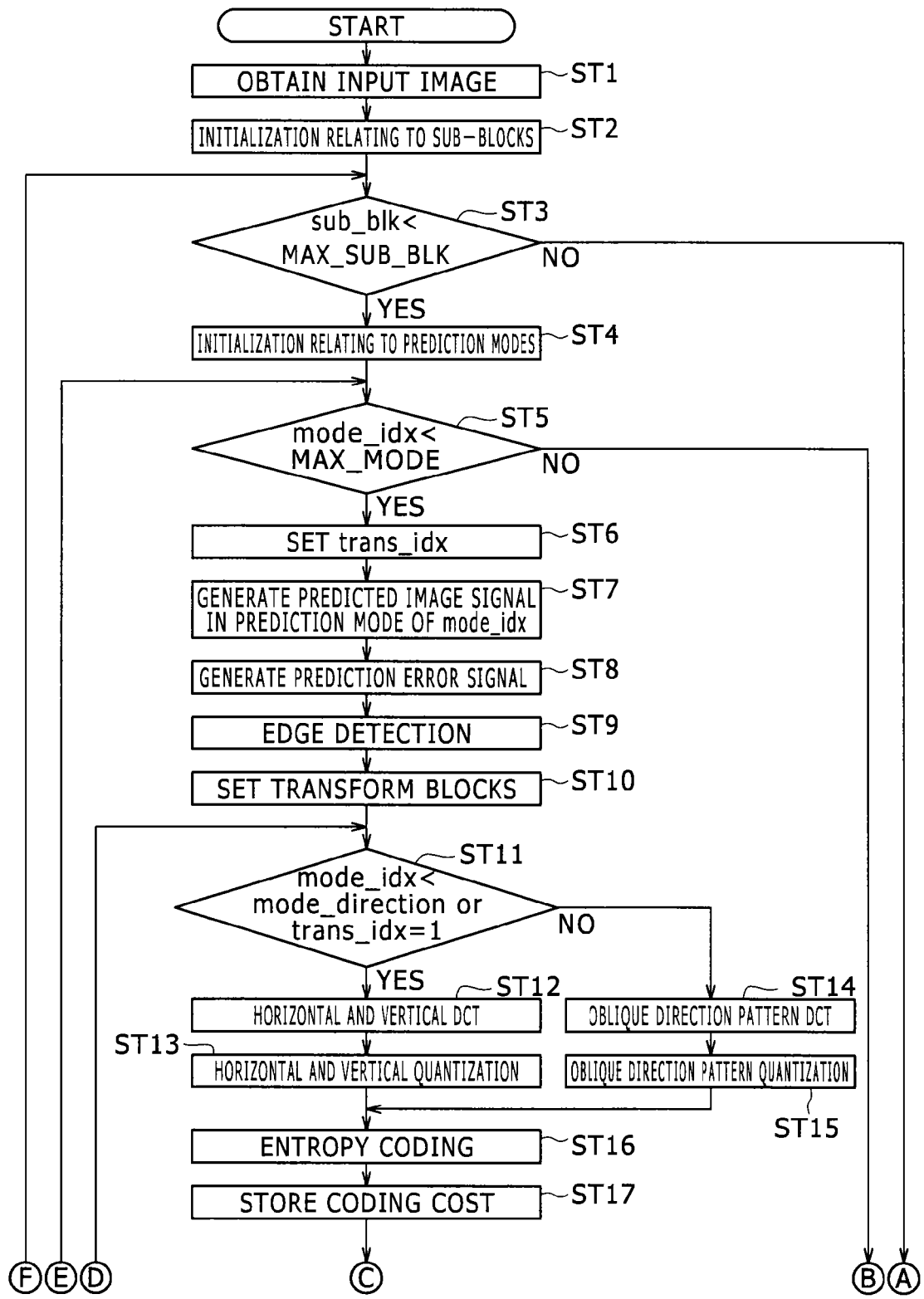

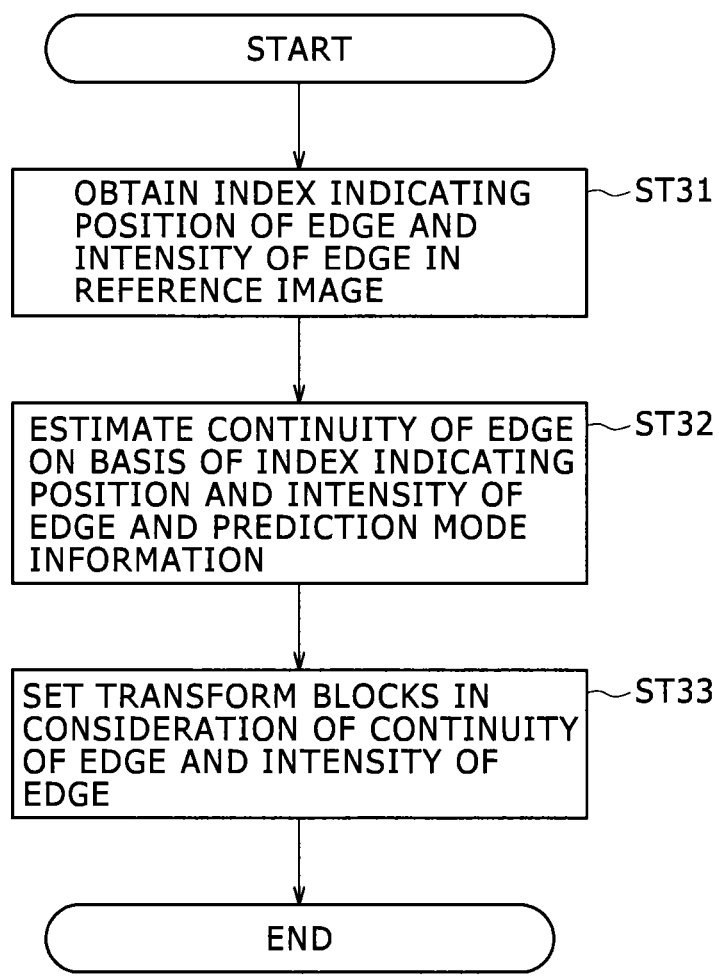

FIG.18A

| a0 | a1 | a2 | a3 | a4 | a5 | a6 | a7 |
|----|----|----|----|----|----|----|----|
| b0 | b1 | b2 | b3 | b4 | b5 | b6 | b7 |
| c0 | c1 | c2 | c3 | c4 | c5 | c6 | c7 |
| d0 | d1 | d2 | d3 | d4 | d5 | d6 | d7 |
| e0 | e1 | e2 | e3 | e4 | e5 | e6 | e7 |
| f0 | f1 | f2 | f3 | f4 | f5 | f6 | f7 |
| g0 | g1 | g2 | g3 | g4 | g5 | g6 | g7 |
| h0 | h1 | h2 | h3 | h4 | h5 | h6 | h7 |

8 PIXELS × 8 PIXELS

FIG.18B

| a0 | a1 | a2 | a3 | a4 |
|----|----|----|----|----|
| b0 | b1 | b2 | b3 | b4 |
| c0 | c1 | c2 | c3 | c4 |
| d0 | d1 | d2 | d3 | d4 |
| e0 | e1 | e2 | e3 | e4 |
| f0 | f1 | f2 | f3 | f4 |

FIG.18C

| a5 | a6 | a7 |
|----|----|----|
| b5 | b6 | b7 |
| c5 | c6 | c7 |
| d5 | d6 | d7 |
| e5 | e6 | e7 |
| f5 | f6 | f7 |

FIG.18D

| g0 | g1 | g2 | g3 | g4 |
|----|----|----|----|----|
| h0 | h1 | h2 | h3 | h4 |

FIG.18E

| g5 | g6 | g7 |
|----|----|----|
| h5 | h6 | h7 |

DETECTION OF EDGES OF
MOTION-COMPENSATED SIGNAL

ESTIMATED EDGE OF
CODING OBJECT

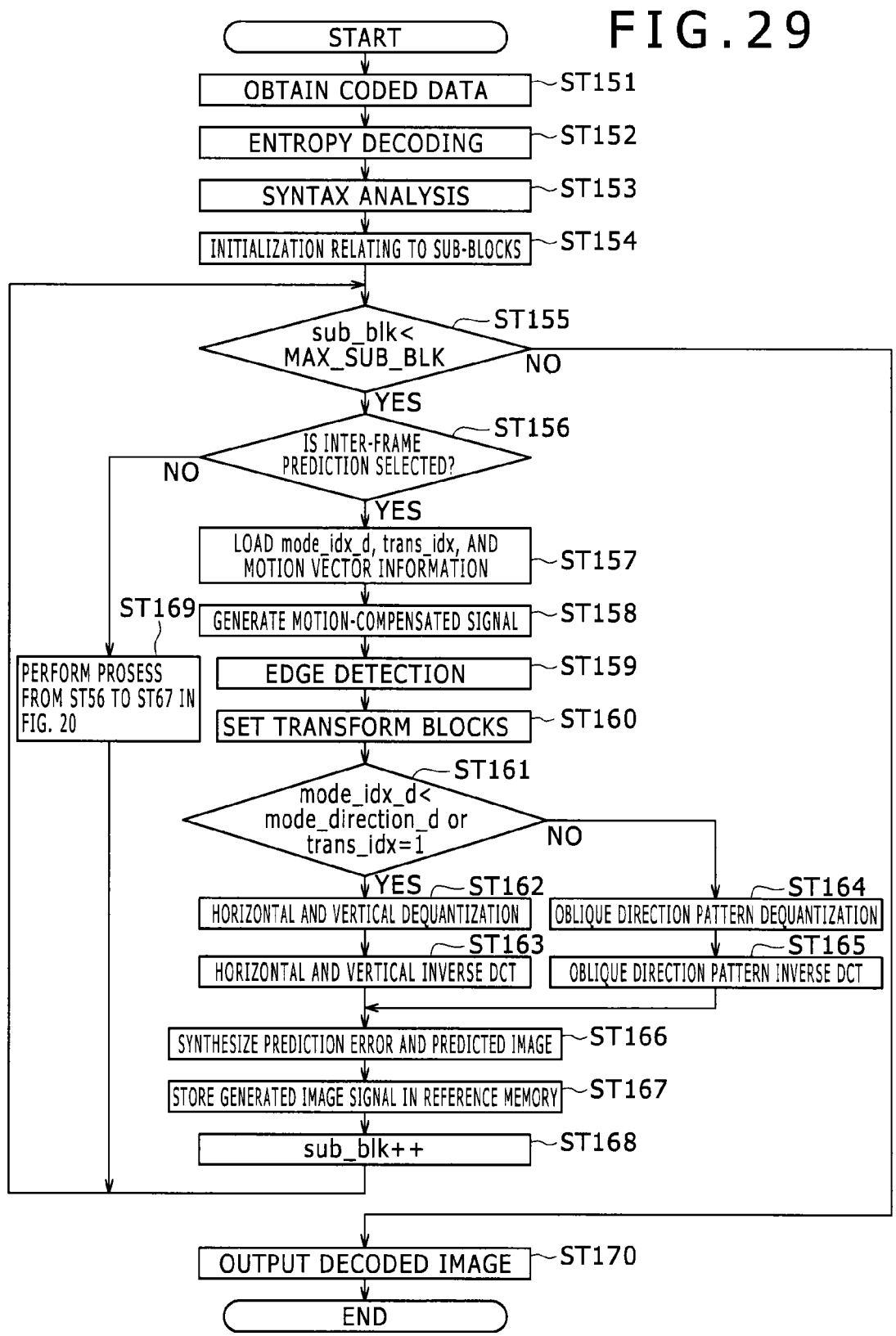

IMAGE CODING DEVICE, IMAGE DECODING DEVICE, METHODS THEREOF, AND PROGRAMS

CROSS-REFERENCE TO RELATED APPLICATIONS

This application is a continuation of and claims the benefit of priority from U.S. Ser. No. 13/968,088, filed Aug. 15, 2013, which is a continuation of and claims the benefit of priority from U.S. Ser. No. 13/347,982, filed Jan. 11, 2012, which claims the benefit of priority from Japanese Patent Application No. 2011-027385, filed Feb. 10, 2011, the entire contents of each of which are incorporated herein by reference.

BACKGROUND

The present disclosure relates to an image coding device, an image decoding device, methods thereof, and programs, and particularly to enabling improvements of subjective image quality and coding efficiency.

In related art, still images and moving images have large amounts of data, and are thus generally coded at a time of transmission or at a time of recording onto a medium. A coding system such as an H.264/MPEG (motion picture expert group)-4 AVC (advanced video coding) (hereinafter referred to as H.264/AVC) system or the like performs a discrete cosine transform (hereinafter referred to as a DCT)/inverse discrete cosine transform (hereinafter referred to as an IDCT). The DCT/IDCT is realized by performing a one-dimensional DCT/IDCT twice in a horizontal direction and a vertical direction. On the other hand, when prediction errors of intra-frame prediction (intra prediction) include an edge, energy can be concentrated more by performing a DCT in a direction along the edge rather than performing a DCT in the horizontal direction and the vertical direction.

For example, Japanese Patent Laid-Open No. 2009-272727 determines a direction of performing an orthogonal transform according to a mode of intra-frame prediction when intra-frame prediction as in the H.264/AVC system using spatial correlation is performed because of a strong possibility that a prediction direction and the direction of prediction errors are the same. By thus determining a direction of performing an orthogonal transform, higher energy concentration is achieved, and coding efficiency is improved.

SUMMARY

When an orthogonal transform is performed, the block size of transform blocks as units of the orthogonal transform as well as the direction of the orthogonal transform is an important element for improving energy concentration. In this case, when a continuous edge straddles a plurality of transform blocks, degradation such that the edge is interrupted at block boundaries becomes conspicuous as a result of subsequent quantization. In addition, because a DCT has a characteristic of easily concentrating the energy of a steady signal, coding efficiency is decreased when a large number of transform blocks include an edge.

It is accordingly desirable to provide an image coding device, an image decoding device, methods thereof, and programs that can improve subjective image quality and coding efficiency.

According to a first embodiment of the present technology, there is provided an image coding device including: an edge detecting section configured to perform edge detection using an image signal of a reference image for a coding object block; a transform block setting section configured to set transform blocks by dividing the coding object block such that a boundary between the blocks after division does not include an edge on a basis of a result of the edge detection; and a coding processing section configured to generate coded data by performing processing including an orthogonal transform of each of the transform blocks.

In this technology, the position of an edge and the intensity of the edge are detected using the image signal of a reference image for a coding object block. On the basis of a result of the edge detection, the coding object block is divided, and transform blocks to be subjected to an orthogonal transform or the like are set. The transform blocks are set such that boundaries between the transform blocks as the blocks after the division of the coding object block do not include an edge. In addition, the priorities of edges are determined according to the intensities of the edges, and the transform blocks are set such that an edge of high priority is not included. In detecting the edge, an image of a coded block adjacent to the coding object block is used as a reference image. In addition, the transform blocks are set with the detected edge estimated to be continuous in the prediction direction of an intra-frame prediction mode. In addition, a prediction mode of high coding efficiency is selected, coding processing is performed, and information indicating the selected prediction mode is included in coded data obtained by performing the coding processing. In addition, information indicating the set transform blocks is included in the coded data. In addition, in detecting the edge, a coded image in a temporal direction with respect to the coding object block is also used.

According to a second embodiment of the present technology, there is provided an image coding method including: performing edge detection using an image signal of a reference image for a coding object block; setting transform blocks by dividing the coding object block such that a boundary between the blocks after division does not include an edge on a basis of a result of the edge detection; and generating coded data by performing processing including an orthogonal transform of each of the transform blocks.

According to a third embodiment of the present technology, there is provided a program for making image coding performed on a computer, the program including: performing edge detection using an image signal of a reference image for a coding object block; setting transform blocks by dividing the coding object block such that a boundary between the blocks after division does not include an edge on a basis of a result of the edge detection; and generating coded data by performing processing including an orthogonal transform of each of the transform blocks.

According to a fourth embodiment of the present technology, there is provided an image decoding device including: an information extracting section configured to extract prediction mode information from coded data; an edge detecting section configured to perform edge detection using an image signal of a reference image for a decoding object block; a transform block setting section configured to set transform blocks by dividing the decoding object block such that a boundary between the blocks after division does not include an edge on a basis of the prediction mode information and a result of the edge detection; and a decoding processing section configured to generate an image signal by performing processing including an inverse orthogonal transform of each of the transform blocks.

In this technology, prediction mode information is extracted from coded data. In addition, an edge is detected using the image signal of a reference image for a decoding object block, and the position and intensity of the edge are detected. On the basis of a result of detection of the edge and the extracted prediction mode information, the decoding object block is divided, and transform blocks to be subjected to an inverse orthogonal transform or the like are set. The transform blocks are set such that boundaries between the transform blocks as the blocks after the division of the decoding object block do not include an edge. In addition, the priorities of edges are determined according to the intensities of the edges, and the transform blocks are set such that the boundaries between the transform blocks do not include an edge of high priority. In detecting the edge, an image of a decoded block adjacent to the decoding object block is used as a reference image. In addition, the transform blocks are set with the detected edge estimated to be continuous in the prediction direction of an intra-frame prediction mode. In addition, the edge is detected using a decoded image in a temporal direction with respect to the decoding object block as a reference image. After the transform blocks are thus set, a decoded image is generated by performing processing including an inverse orthogonal transform of each of the set transform blocks.

According to a fifth embodiment of the present technology, there is provided an image decoding method including: extracting prediction mode information from coded data; performing edge detection using an image signal of a reference image for a decoding object block; setting transform blocks by dividing the decoding object block such that a boundary between the blocks after division does not include an edge on a basis of the prediction mode information and a result of the edge detection; and generating an image signal by performing processing including inverse transform processing of each of the transform blocks.

According to a sixth embodiment of the present technology, there is provided a program for making decoding of coded data performed on a computer, the program including: extracting prediction mode information from coded data; performing edge detection using an image signal of a reference image for a decoding object block; setting transform blocks by dividing the decoding object block such that a boundary between the blocks after division does not include an edge on a basis of the prediction mode information and a result of the edge detection; and generating an image signal by performing processing including inverse transform processing of each of the transform blocks.

Incidentally, the programs according to the embodiments of the present technology are for example programs that can be provided by storage media provided in a computer readable format for general-purpose computer systems capable of executing various program codes and by communication media, by for example storage media such as optical disks, magnetic disks, semiconductor memories, and the like or by communication media such as networks and the like. Such programs are provided in a computer readable format, whereby processing according to the programs is realized on computer systems.

According to the embodiment of the present technology, an edge is detected using the image signal of a reference image for a coding object block. On the basis of a result of the edge detection, transform blocks are set by dividing the coding object block such that boundaries between the blocks after the division do not include the edge. In addition, transform processing is performed for each transform block, and coded data is generated. An image decoding device for decoding the coded data detects the edge using the image signal of the reference image for a decoding object block. On the basis of a result of the edge detection, transform blocks are set by dividing the decoding object block such that boundaries between the blocks after the division do not include the edge. In addition, inverse transform processing is performed for each transform block, and the image signal of a decoded image is generated.

It is therefore possible to prevent a continuous edge from straddling a plurality of transform blocks and thus improve subjective image quality. In addition, transform blocks not including an edge can be increased, so that an effect of improving efficiency of energy concentration can be obtained.

BRIEF DESCRIPTION OF THE DRAWINGS

FIG. 9 is a diagram of assistance in explaining positional relation between a sub-block and an adjacent pixel signal;

FIG. 13 is a flowchart (1/2) showing operation of the image coding device in the first embodiment;

FIG. 17 is a flowchart showing a procedure for setting transform blocks;

FIGS. 18A, 18B, 18C, 18D, and 18E are diagrams showing a case in which transform blocks are set by dividing a sub-block of 8×8 pixels into four parts;

FIG. 29 is a flowchart showing operation of the image decoding device in the third embodiment.

DETAILED DESCRIPTION OF THE PREFERRED EMBODIMENTS

Modes for carrying out the present technology will hereinafter be described. The present technology prevents a continuous edge from straddling a plurality of transform blocks and thus improves subjective image quality by setting transform blocks for an orthogonal transform in consideration of edge continuity on the basis of a mode of intra-frame prediction (intra prediction). In addition, the present technology improves energy concentration by increasing transform blocks not including an edge. Further, description will be made of applicability of the present technology also to inter-frame prediction (inter prediction). Incidentally, description will be made in the following order.
1. First Embodiment
1-1. Configuration of Image Coding Device
1-2. Operation of Image Coding Device
1-3. Configuration of Image Decoding Device
1-4. Operation of Image Decoding Device
2. Second Embodiment
2-1. Configuration of Image Coding Device
2-2. Operation of Image Coding Device
2-3. Configuration of Image Decoding Device
2-4. Operation of Image Decoding Device
3. Third Embodiment
3-1. Configuration of Image Coding Device
3-2. Operation of Image Coding Device
3-3. Configuration of Image Decoding Device
3-4. Operation of Image Decoding Device
<1. First Embodiment>
[1-1. Configuration of Image Coding Device]

Figure 1:
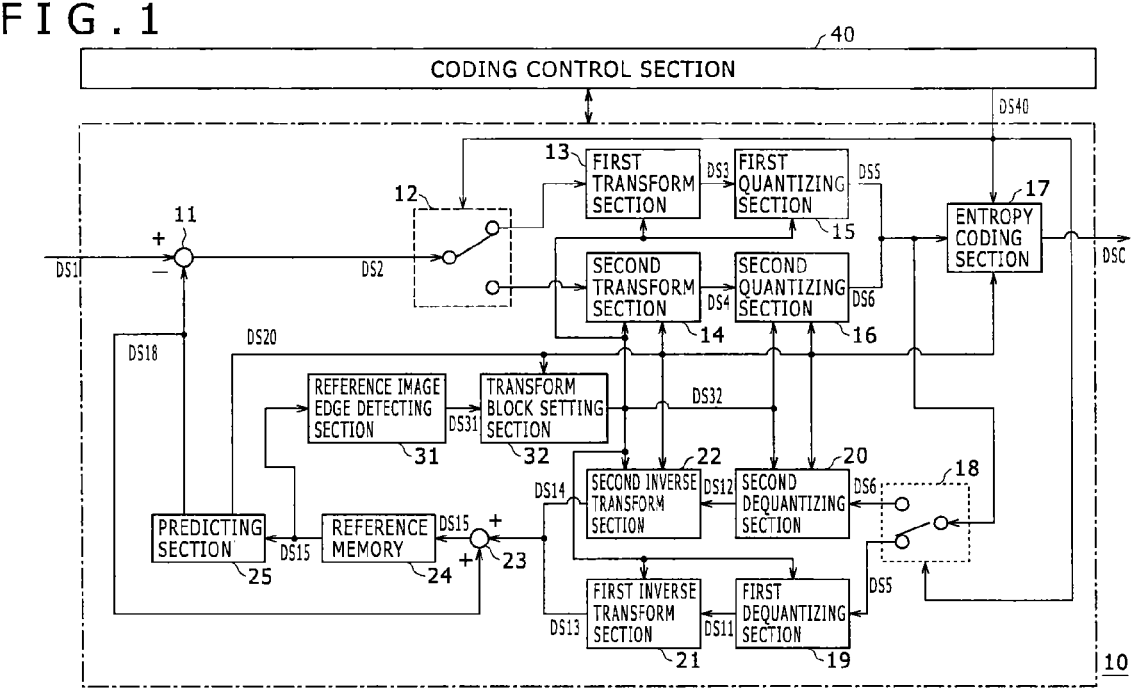
FIG. 1 is a diagram showing a configuration of an image coding device in a first embodiment.

FIG. 1 shows a configuration of an image coding device in a first embodiment. The image coding device 10 includes an arithmetic section 11, a processing selecting switch 12, a first transform section 13, a second transform section 14, a first quantizing section 15, a second quantizing section 16, and an entropy coding section 17. The image coding device 10 also includes a processing selecting switch 18, a first dequantizing section 19, a second dequantizing section 20, a first inverse transform section 21, a second inverse transform section 22, an arithmetic section 23, a reference memory 24, and a predicting section 25. The image coding device 10 further includes a reference image edge detecting section 31, a transform block setting section 32, and a coding control section 40.

The arithmetic section 11 calculates a prediction error of a predicted image with respect to an input image by subtracting a predicted image signal DS18 generated in the predicting section 25 to be described later from an input image signal DS1. The arithmetic section 11 outputs a prediction error signal DS2 indicating the prediction error to the processing selecting switch 12.

The processing selecting switch 12 makes switch selection on the basis of transform information DS40 supplied from the coding control section 40 to output the prediction error signal DS2 to the first quantizing section 15 or the second quantizing section 16.

Figure 2A:
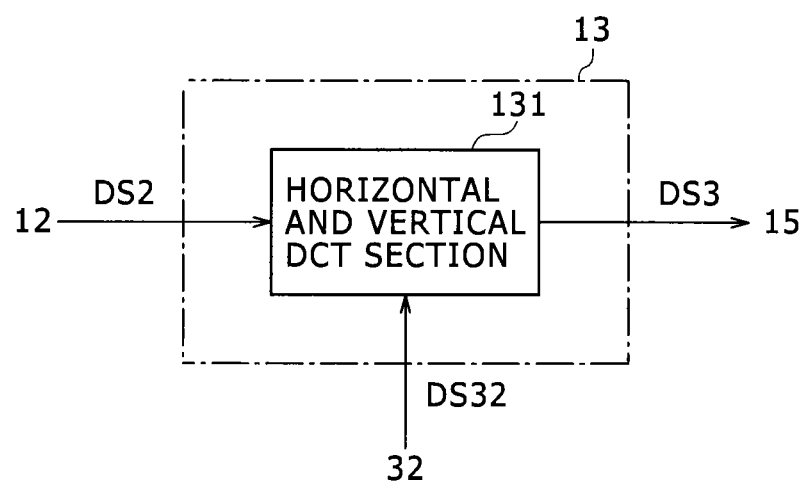
FIGS. 2A and 2B are diagrams showing configurations of a first transform section and a first quantizing section.

As shown in FIG. 2A, the first transform section 13 includes a horizontal and vertical DCT section 131. The horizontal and vertical DCT section 131 performs a horizontal and vertical DCT of the prediction error signal DS2 supplied from the processing selecting switch 12. In addition, the horizontal and vertical DCT section 131 sets transform blocks in which the horizontal and vertical DCT is performed on the basis of transform block setting information DS32 supplied from the transform block setting section 32 to be described later. The horizontal and vertical DCT section 131 outputs transform coefficients DS3 obtained by performing the horizontal and vertical DCT to the first quantizing section 15.

Figure 2B:
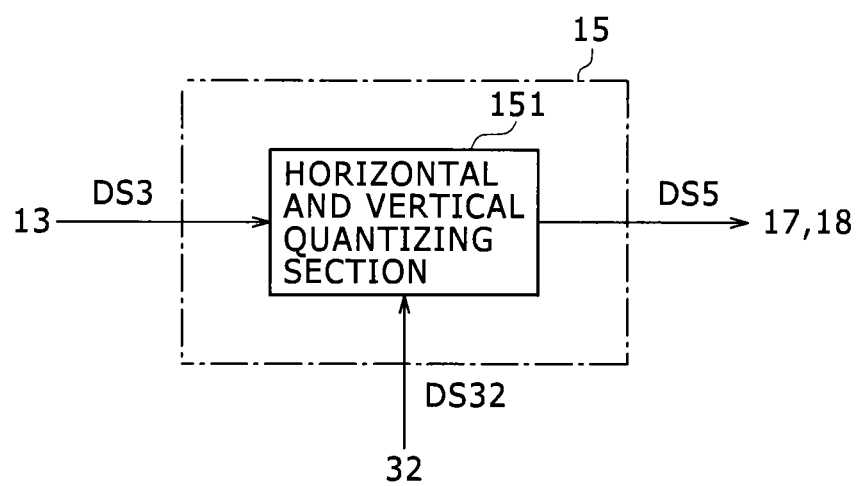

As shown in FIG. 2B, the first quantizing section 15 has a horizontal and vertical quantizing section 151. The horizontal and vertical quantizing section 151 quantizes the transform coefficients DS3 output from the first transform section 13. The horizontal and vertical quantizing section 151 outputs quantized data DS5 obtained by performing the quantization to the entropy coding section 17 and the processing selecting switch 18.

Figure 3:
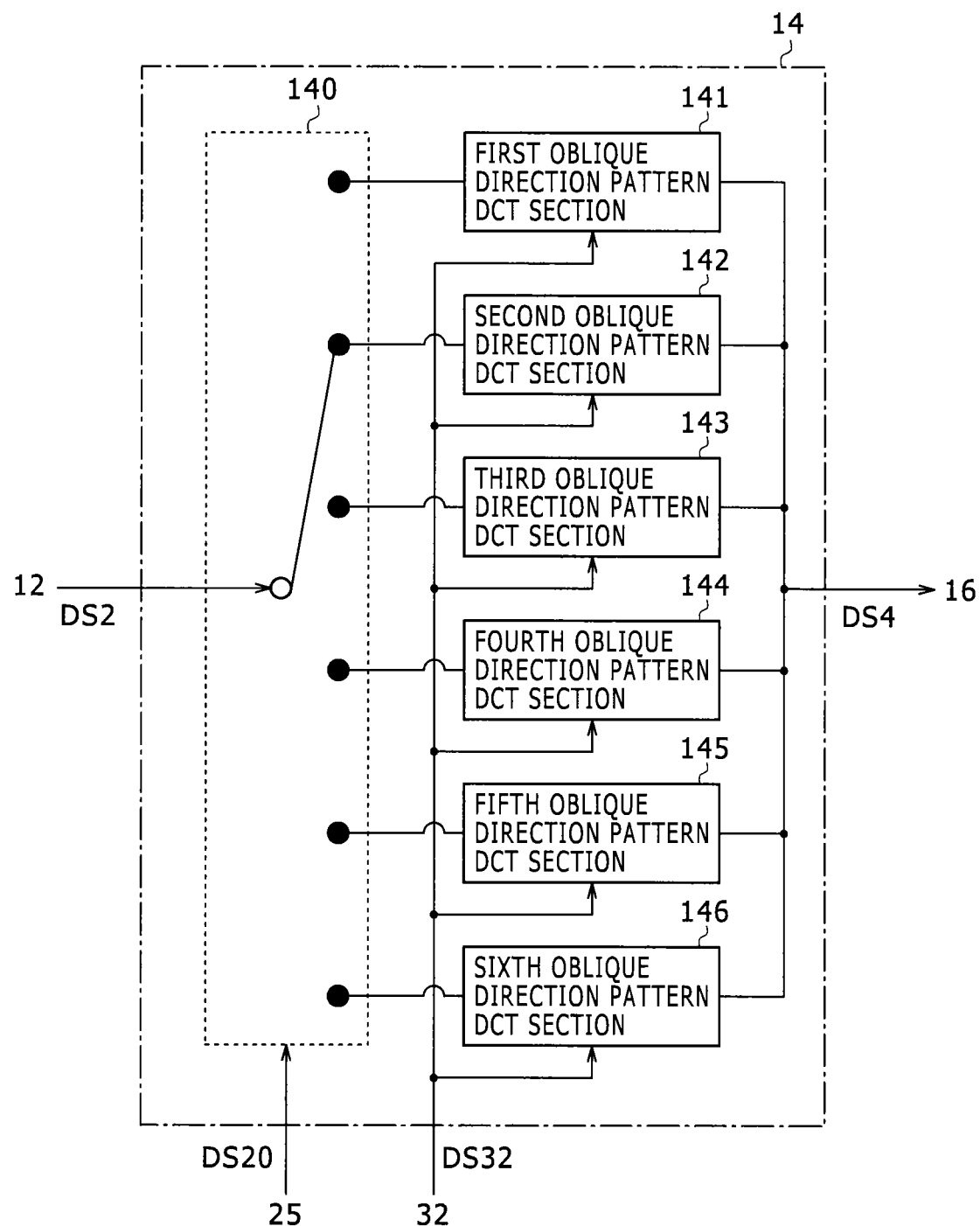
FIG. 3 is a diagram showing a configuration of a second transform section.

The second transform section 14 includes DCT sections provided for respective prediction directions as oblique directions and a pattern selecting switch for selecting a DCT section corresponding to a prediction direction. For example, as will be described later with reference to FIGS. 10A to 10I, suppose that six modes from a prediction mode 3 to a prediction mode 8 whose prediction directions are oblique directions are provided in an intra-frame prediction mode. In this case, as shown in FIG. 3, the second transform section 14 includes a first oblique direction pattern DCT section 141 corresponding to the oblique direction of the prediction mode 3, . . . , and a sixth oblique direction pattern DCT section 146 corresponding to the oblique direction of the prediction mode 8. The second transform section 14 also includes a pattern selecting switch 140 for selecting a DCT section corresponding to a prediction mode.

The pattern selecting switch 140 supplies the prediction error signal DS2 supplied from the processing selecting switch 12 to one of the first to sixth oblique direction pattern DCT sections 141 to 146 on the basis of prediction mode information DS20 from the predicting section 25 to be described later. For example, when the prediction mode information DS20 indicates the prediction mode 3, the pattern selecting switch 140 supplies the prediction error signal DS2 to the first oblique direction pattern DCT section 141 corresponding to the oblique direction of the prediction mode 3. When the prediction mode information DS20 indicates the prediction mode 8, the pattern selecting switch 140 supplies the prediction error signal DS2 to the sixth oblique direction pattern DCT section 146 corresponding to the oblique direction of the prediction mode 8.

The first oblique direction pattern DCT section 141 performs a DCT according to a prediction direction on the prediction error signal DS2 supplied via the pattern selecting switch 140. In addition, the first oblique direction pattern DCT section 141 sets transform blocks for the DCT on the basis of the transform block setting information DS32 supplied from the transform block setting section 32 to be described later. The first oblique direction pattern DCT section 141 outputs transform coefficients DS4 obtained by performing the DCT to the second quantizing section 16. The second to sixth oblique direction pattern DCT sections 142 to 146 similarly perform a DCT according to a prediction direction on the prediction error signal DS2, and output resulting transform coefficients DS4 to the second quantizing section 16. Thus, the second transform section 14 selectively uses the first to sixth oblique direction pattern DCT sections 141 to 146 on the basis of the prediction mode information DS20 to perform a DCT according to a prediction mode in each transform block based on the transform block setting information DS32.

Figure 4:
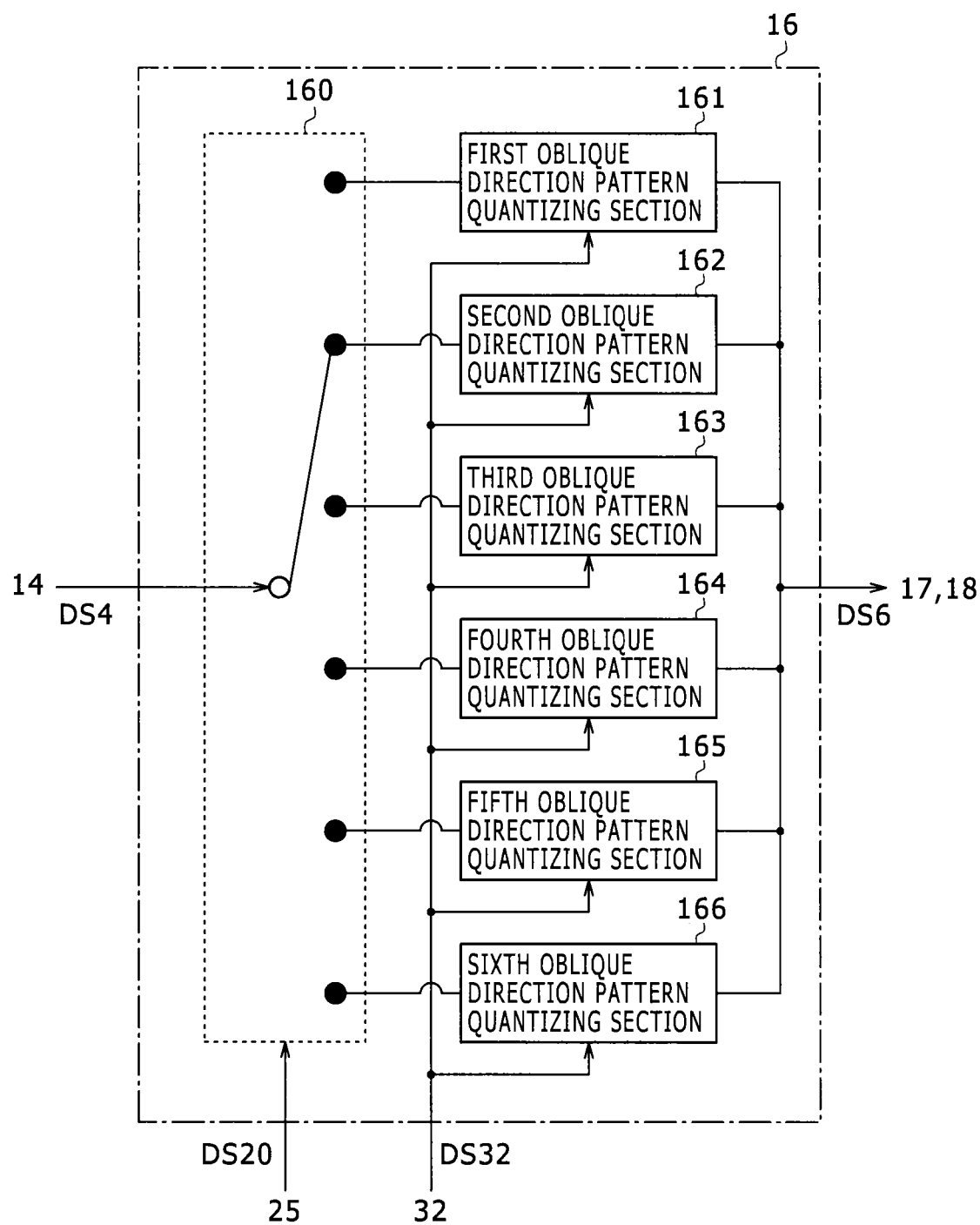
FIG. 4 is a diagram showing a configuration of a second quantizing section.

The second quantizing section 16 includes quantizing sections provided for respective prediction directions as oblique directions and a pattern selecting switch for selecting a quantizing section corresponding to a prediction direction. For example, suppose that the six modes from the prediction mode 3 to the prediction mode 8 whose prediction directions are oblique directions are provided. In this case, as shown in FIG. 4, the second quantizing section 16 includes a first oblique direction pattern quantizing section 161 corresponding to the oblique direction of the prediction mode 3, . . . , and a sixth oblique direction pattern quantizing section 166 corresponding to the oblique direction of the prediction mode 8. The second quantizing section 16 also includes a pattern selecting switch 160 for selecting a quantizing section corresponding to a prediction mode.

The pattern selecting switch 160 supplies the transform coefficients DS4 supplied from the second transform section 14 to one of the first to sixth oblique direction pattern quantizing sections 161 to 166 on the basis of the prediction mode information DS20 from the predicting section 25. For example, when the prediction mode information DS20 indicates the prediction mode 3, the pattern selecting switch 160 supplies the transform coefficients DS4 obtained in the first oblique direction pattern DCT section 141 of the second transform section 14 to the first oblique direction pattern quantizing section 161 corresponding to the prediction mode 3. When the prediction mode information DS20 indicates the prediction mode 8, the pattern selecting switch 160 supplies the transform coefficients DS4 obtained in the sixth oblique direction pattern DCT section 146 of the second transform section 14 to the sixth oblique direction pattern quantizing section 166 corresponding to the oblique direction of the prediction mode 8.

The first oblique direction pattern quantizing section 161 quantizes the transform coefficients DS4 supplied from the first oblique direction pattern DCT section 141 of the second transform section 14 via the pattern selecting switch 160. In addition, the first oblique direction pattern quantizing section 161 quantizes transform coefficients DS4 in each transform block on the basis of the transform block setting information DS32 supplied from the transform block setting section 32 to be described later. The first oblique direction pattern quantizing section 161 outputs quantized data DS6 obtained by performing the quantization to the entropy coding section 17 and the processing selecting switch 18. The second to sixth oblique direction pattern quantizing sections 162 to 166 similarly quantize the transform coefficients DS4 obtained by DCTs according to prediction directions in each transform block, and output resulting quantized data DS6 to the entropy coding section 17 and the processing selecting switch 18. Thus, the second quantizing section 16 quantizes the transform coefficients obtained by performing the DCTs according to the prediction directions in the second transform section 14 in each DCT block in the respective prediction directions.

The entropy coding section 17 in FIG. 1 performs entropy coding of the quantized data DS5 supplied from the first quantizing section 15 or the quantized data DS6 supplied from the second quantizing section 16. The entropy coding section 17 also performs entropy coding of the prediction mode information DS20 generated in the predicting section 25, the transform information DS40 generated in the coding control section 40, and the like to be described later. The entropy coding section 17 outputs coded data DSC obtained by performing the entropy coding.

The processing selecting switch 18 selects an inverse transform method on the basis of the transform information DS40 supplied from the coding control section 40. The processing selecting switch 18 outputs the quantized data DS5 from the first quantizing section 15 to the first dequantizing section 19, and outputs the quantized data DS6 from the second quantizing section 16 to the second dequantizing section 20.

Figure 5A:
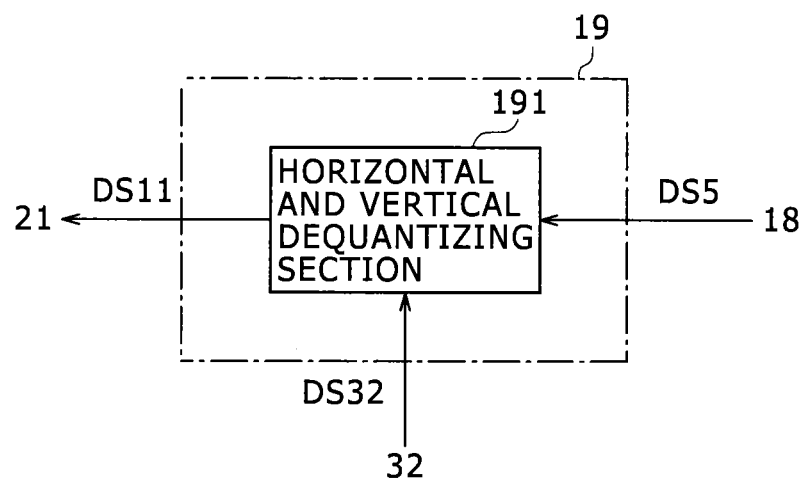
FIGS. 5A and 5B are diagrams showing configurations of a first inverse transform section and a first dequantizing section.

As shown in FIG. 5A, the first dequantizing section 19 has a horizontal and vertical dequantizing section 191. The horizontal and vertical dequantizing section 191 dequantizes the quantized data DS5 supplied via the processing selecting switch 18. In addition, the horizontal and vertical dequantizing section 191 dequantizes the quantized data in each transform block corresponding to that of the first quantizing section 15 on the basis of the transform block setting information DS32 supplied from the transform block setting section 32. The first dequantizing section 19 outputs transform coefficients DS11 obtained by performing the dequantization to the first inverse transform section 21.

Figure 5B:
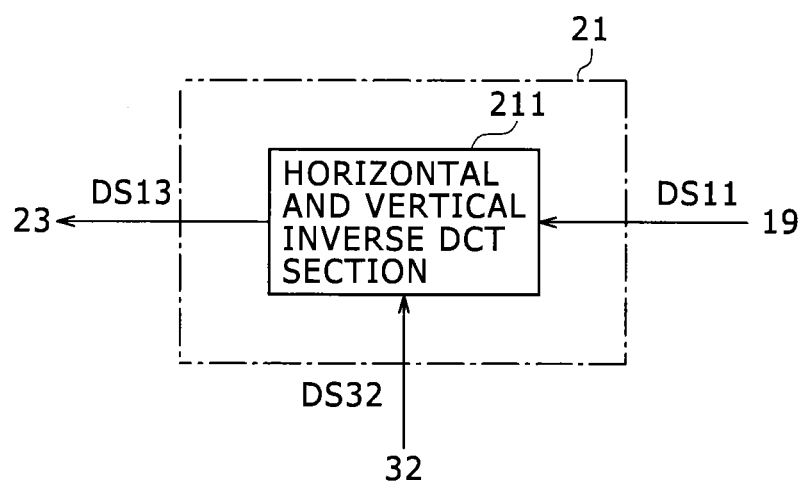

As shown in FIG. 5B, the first inverse transform section 21 has a horizontal and vertical inverse DCT section 211. The horizontal and vertical inverse DCT section 211 subjects the transform coefficients DS11 supplied from the first dequantizing section 19 to an inverse DCT in the horizontal and vertical directions which inverse DCT corresponds to the DCT in the horizontal and vertical directions in the first transform section 13. The horizontal and vertical inverse DCT section 211 outputs a prediction error signal DS13 obtained by performing the inverse DCT to the arithmetic section 23.

Figure 6:
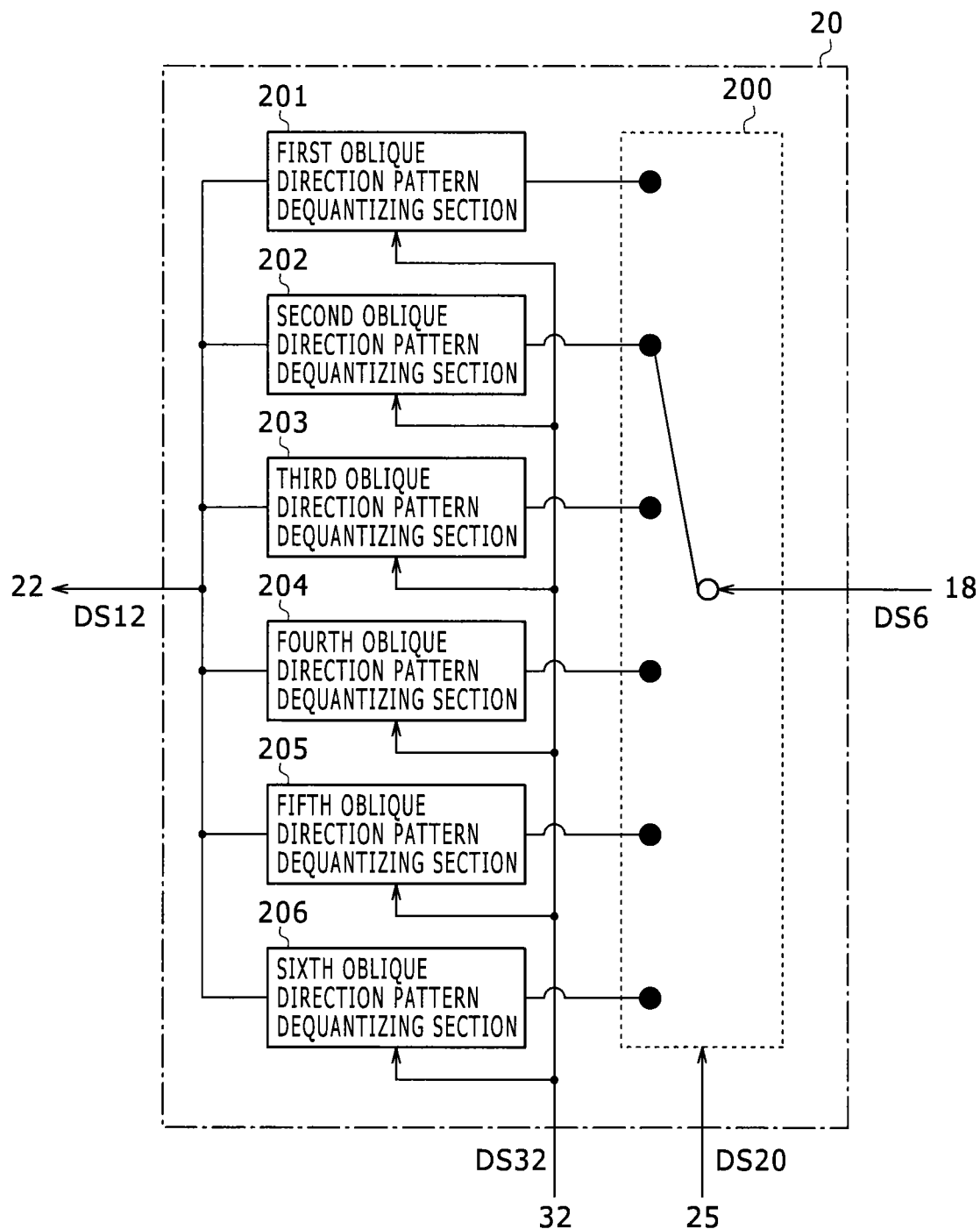
FIG. 6 is a diagram showing a configuration of a second dequantizing section.

The second dequantizing section 20 is configured to perform dequantization corresponding to the quantization performed in the second quantizing section 16. For example, as shown in FIG. 6, the second dequantizing section 20 includes a pattern selecting switch 200 and a first oblique direction pattern dequantizing section 201 to a sixth oblique direction pattern dequantizing section 206.

The pattern selecting switch 200 supplies the quantized data DS6 supplied via the processing selecting switch 18 to one of the first to sixth oblique direction pattern dequantizing sections 201 to 206 on the basis of the prediction mode information DS20 from the predicting section 25. For example, when the prediction mode information DS20 indicates the prediction mode 3, the pattern selecting switch 200 supplies the quantized data DS6 obtained in the first oblique direction pattern quantizing section 161 of the second quantizing section 16 to the first oblique direction pattern dequantizing section 201 corresponding to the prediction mode 3. Similarly, when the prediction mode information DS20 indicates the prediction mode 8, the pattern selecting switch 200 supplies the quantized data DS6 obtained in the sixth oblique direction pattern quantizing section 166 of the second quantizing section 16 to the sixth oblique direction pattern dequantizing section 206 corresponding to the prediction mode 8.

The first oblique direction pattern dequantizing section 201 subjects the quantized data DS6 supplied via the pattern selecting switch 200 to dequantization corresponding to the quantization of the first oblique direction pattern quantizing section 161 in the second quantizing section 16. In addition, the first oblique direction pattern dequantizing section 201 dequantizes the quantized data in each transform block corresponding to that of the second quantizing section 16 on the basis of the transform block setting information DS32 supplied from the transform block setting section 32. The first oblique direction pattern dequantizing section 201 outputs transform coefficients DS12 obtained by performing the dequantization to the second inverse transform section 22. In addition, the second to sixth oblique direction pattern dequantizing sections 202 to 206 similarly dequantize the supplied quantized data DS6, and output resulting transform coefficients DS12 to the second inverse transform section 22. Thus, the second dequantizing section 20 performs dequantization in correspondence with the quantization of the second quantizing section 16.

Figure 7:
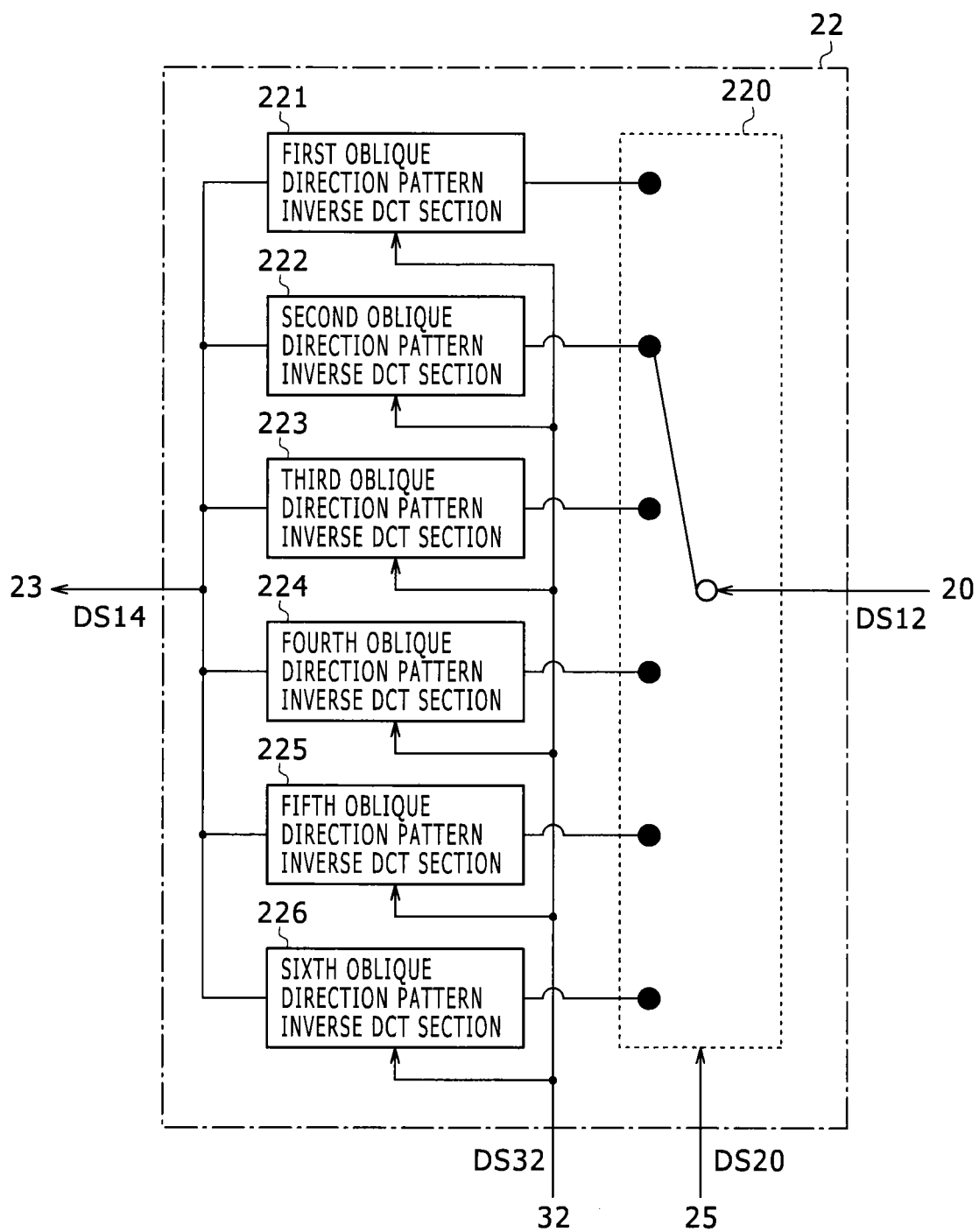
FIG. 7 is a diagram showing a configuration of a second inverse transform section.

The second inverse transform section 22 is configured to perform an inverse DCT corresponding to the DCT performed in the second transform section 14. For example, as shown in FIG. 7, the second inverse transform section 22 includes a pattern selecting switch 220 and a first oblique direction pattern inverse DCT section 221 to a sixth oblique direction pattern inverse DCT section 226.

The pattern selecting switch 220 supplies the transform coefficients DS12 supplied from the second dequantizing section 20 to one of the first to sixth oblique direction pattern inverse DCT sections 221 to 226 on the basis of the prediction mode information DS20 from the predicting section 25. For example, when the prediction mode information DS20 indicates the prediction mode 3, the pattern selecting switch 220 supplies the transform coefficients DS12 obtained in the first oblique direction pattern dequantizing section 201 in the second dequantizing section 20 to the first oblique direction pattern inverse DCT section 221 corresponding to the prediction mode 3. Similarly, when the prediction mode information DS20 indicates the prediction mode 8, the pattern selecting switch 220 supplies the transform coefficients DS12 obtained in the sixth oblique direction pattern dequantizing section 206 in the second dequantizing section 20 to the sixth oblique direction pattern inverse DCT section 226 corresponding to the prediction mode 8.

The first oblique direction pattern inverse DCT section 221 subjects the transform coefficients DS12 supplied via the pattern selecting switch 220 to an inverse DCT corresponding to the DCT of the first oblique direction pattern DCT section 141 in the second transform section 14. The first oblique direction pattern inverse DCT section 221 performs an inverse DCT of transform coefficients in each transform block corresponding to that of the second transform section 14 on the basis of the transform block setting information DS32 supplied from the transform block setting section 32. The first oblique direction pattern inverse DCT section 221 outputs a prediction error signal DS14 obtained by performing the inverse DCT to the arithmetic section 23. In addition, the second to sixth oblique direction pattern inverse DCT sections 222 to 226 similarly perform an inverse DCT of the supplied transform coefficients DS12, and output a resulting prediction error signal DS14 to the arithmetic section 23. Thus, the second inverse transform section 22 performs the inverse DCTs corresponding to the DCTs according to the prediction directions in the second transform section 14.

The arithmetic section 23 generates a reference image signal DS15 by adding the predicted image signal DS18 generated in the predicting section 25 to the prediction error signal DS13 supplied from the first inverse transform section 21 or the prediction error signal DS14 supplied from the second inverse transform section 22. The arithmetic section 23 stores the generated reference image signal DS15 in the reference memory 24.

The reference image signal DS15 stored in the reference memory 24 is supplied to the predicting section 25 and the reference image edge detecting section 31.

The predicting section 25 performs intra-frame prediction in each prediction mode using the reference image signal DS15. In addition, the predicting section 25 determines a prediction mode that maximizes coding efficiency, and generates prediction mode information DS20 indicating the prediction mode that maximizes coding efficiency. The predicting section 25 outputs the generated prediction mode information DS20 to the second transform section 14, the second quantizing section 16, the entropy coding section 17, the second dequantizing section 20, the second inverse transform section 22, and the transform block setting section 32. Further, the predicting section 25 generates the predicted image signal DS18 in the prediction mode that maximizes coding efficiency, and outputs the predicted image signal DS18 to the arithmetic sections 11 and 23.

The reference image edge detecting section 31 detects an edge using an image signal of a coded adjacent bock stored in the reference memory 24, and outputs an index DS31 indicating the position of the edge and the intensity (steepness of change in density) of the edge to the transform block setting section 32.

The transform block setting section 32 estimates the continuity of the edge within a sub-block as a coding object on the basis of the index DS31 supplied from the reference image edge detecting section 31 and the prediction mode information DS20 supplied from the predicting section 25. The transform block setting section 32 divides the sub-block as the coding object from a result of the estimation, sets transform blocks in an orthogonal transform and quantization, and generates transform block setting information DS32 indicating the set transform blocks. The transform block setting section 32 outputs the generated transform block setting information DS32 to the first transform section 13, the second transform section 14, the first quantizing section 15, the second quantizing section 16, the first dequantizing section 19, the second dequantizing section 20, the first inverse transform section 21, and the second inverse transform section 22.

The coding control section 40 generates transform information DS40. The transform information DS40 is information for selecting either a process of performing a horizontal and vertical DCT in relation to the orthogonal transform and horizontal and vertical quantization or a process of performing a one-dimensional DCT and quantization along the prediction direction indicated by the prediction mode information DS20. The coding control section 40 outputs the generated transform information DS40 to the processing selecting switch 12, the entropy coding section 17, and the processing selecting switch 18.

[1-2. Operation of Image Coding Device]

Figure 8A:
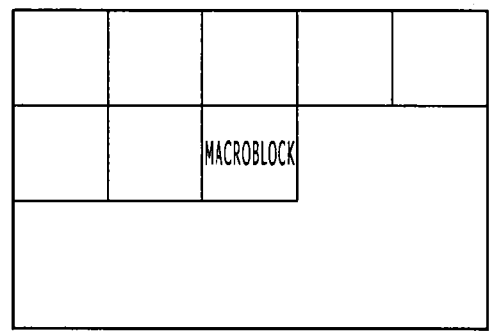
FIGS. 8A, 8B, 8C, and 8D are diagrams showing macroblocks of intra-frame prediction in the H.264/AVC system.
Figure 8B:
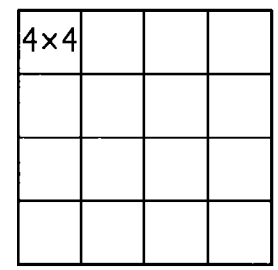
Figure 8C:
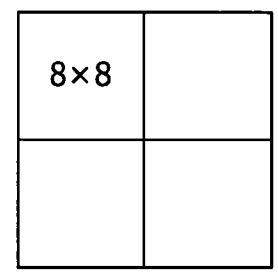
Figure 8D:
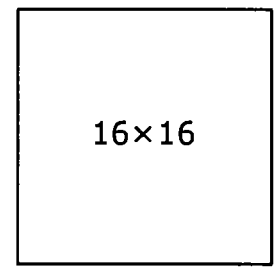

The operation of the image coding device will next be described. In the case of a luminance signal in the intra-frame prediction of the H.264/AVC system, for example, a plurality of macroblocks are set in a coding object frame as shown in FIG. 8A. FIG. 8B shows a macroblock having 16 sub-blocks of 4×4 pixels. FIG. 8C shows a macroblock having four sub-blocks of 8×8 pixels. FIG. 8D shows a macroblock having one sub-block of 16×16 pixels.

In the H.264/AVC system, four modes, that is, prediction modes 0 to 3 are set as prediction modes for sub-blocks of 16×16 pixels. In addition, nine prediction modes, that is, prediction modes 0 to 8 are set as prediction modes for sub-blocks of 8×8 pixels. Further, nine prediction modes, that is, prediction modes 0 to 8 are set as prediction modes for sub-blocks of 4×4 pixels.

Figure 9:
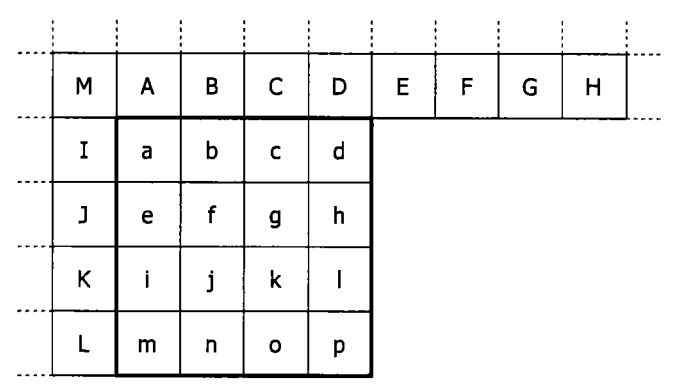

FIG. 9 is a diagram of assistance in explaining positional relation between for example pixels a to p belonging to a sub-block of 4×4 pixels and pixels A to M adjacent to the sub-block in adjoining blocks on a left side, an upper left side, an upper side, and an upper right side of the sub-block.

Figure 10A:
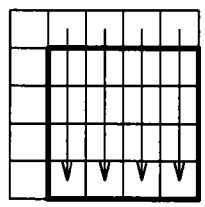
FIGS. 10A, 10B, 10C, 10D, 10E, 10F, 10G, 10H, and 10I are diagrams showing prediction modes for 4×4 pixels in intra-frame prediction.
Figure 10B:
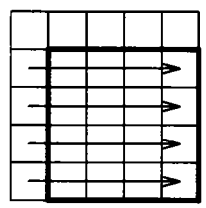
Figure 10C:
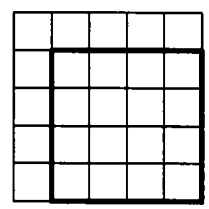

FIGS. 10A to 10I represent prediction modes for 4×4 pixels in intra-frame prediction. Incidentally, arrows in FIGS. 10A to 10I indicate a prediction direction. FIG. 10A represents a prediction mode 0 (vertical). The prediction mode 0 generates predicted values from the reference pixels A to D adjoining in a vertical direction. FIG. 10B represents a prediction mode 1 (horizontal). As indicated by arrows, the prediction mode 1 generates predicted values from the reference pixels I to L adjoining in a horizontal direction. FIG. 10C represents a prediction mode 2 (DC). The prediction mode 2 generates predicted values from the reference pixels A to D and I to L adjoining in the vertical direction and the horizontal direction of the block among the 13 reference pixels A to M.

Figure 10D:
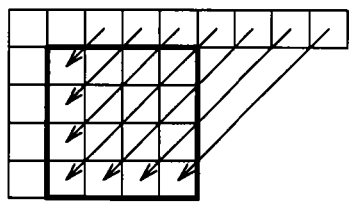
Figure 10E:
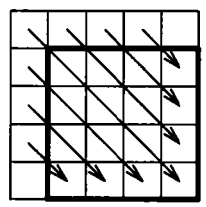
Figure 10F:
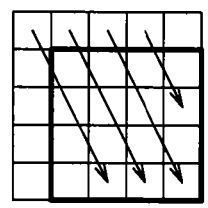

FIG. 10D represents a prediction mode 3 (diagonal down-left). The prediction mode 3 generates predicted values from the reference pixels A to H continuous in the horizontal direction among the 13 reference pixels A to M. FIG. 10E represents a prediction mode 4 (diagonal down-right). The prediction mode 4 generates predicted values from the reference pixels A to D and I to M adjacent to the block in question among the 13 reference pixels A to M. FIG. 10F represents a prediction mode 5 (vertical-right). The prediction mode 5 generates predicted values from the reference pixels A to D and I to M adjacent to the block in question among the 13 reference pixels A to M.

Figure 10G:
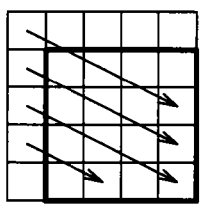
Figure 10H:
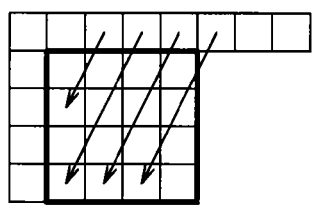
Figure 10I:
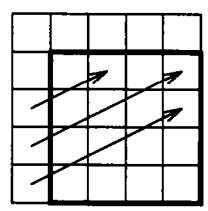

FIG. 10G represents a prediction mode 6 (horizontal-down). As with the prediction mode 4 and the prediction mode 5, the prediction mode 6 generates predicted values from the reference pixels A to D and I to M adjacent to the block in question among the 13 reference pixels A to M. FIG. 10H represents a prediction mode 7 (vertical-left). The prediction mode 7 generates predicted values from the four reference pixels A to D adjoining on the upper side of the block in question and the three reference pixels E to G following the four reference pixels A to D among the 13 reference pixels A to M. FIG. 10I represents a prediction mode 8 (horizontal-up). The prediction mode 8 generates predicted values from the four reference pixels I to L adjoining on the left side of the block in question among the 13 reference pixels A to M.

The predicting section 25 generates a predicted image signal DS18 in each of the above-described prediction modes. In addition, the coding control section 40 generates the transform information DS40 according to a prediction mode selected by the predicting section 25. For example, the coding control section 40 generates the transform information DS40 as information for selecting either a process of performing a horizontal and vertical DCT in relation to an orthogonal transform and horizontal and vertical quantization or a process of performing a one-dimensional DCT and quantization along the prediction direction indicated by the prediction mode information DS20.

When the transform information DS40 indicates a prediction mode of the horizontal and vertical directions, the processing selecting switch 12 supplies the prediction error signal DS2 to the first transform section 13 so that a DCT in the horizontal and vertical directions is performed. In addition, when the transform information DS40 indicates an oblique direction prediction mode, the processing selecting switch 12 supplies the prediction error signal DS2 to the second transform section 14 so that a one-dimensional DCT is performed along the prediction direction.

When the transform information DS40 indicates a prediction mode of the horizontal and vertical directions, the processing selecting switch 18 supplies the quantized data DS5 to the first dequantizing section 19 so that the quantized data obtained by a DCT and quantization in the horizontal and vertical directions is subjected to corresponding dequantization and a corresponding inverse transform. When the transform information DS40 indicates an oblique direction prediction mode, the processing selecting switch 18 supplies the quantized data DS6 to the second dequantizing section 20 so that the quantized data obtained by a one-dimensional DCT and quantization in the oblique direction is subjected to corresponding dequantization and a corresponding inverse transform.

Description in the following will be made of determination of a prediction mode that maximizes coding efficiency. The predicting section 25 performs a coding process in each of the prediction modes, and determines that a prediction mode that minimizes coding cost obtained as a result of the coding process is an optimum mode. Specifically, a coding cost K is calculated by using Equation (1), and a prediction mode that minimizes the coding cost K is set as an optimum mode.

$$K = SAD + \lambda \times OH \quad (1)$$

where a difference error SAD is an absolute value of a difference value between the predicted image signal generated by a prediction method defined in the prediction mode and the input image signal, side information OH is an amount of various information necessary when the prediction mode is used, and a coefficient $\lambda$ is a Lagrange multiplier.

In addition, the determination of the optimum mode is not limited to the case of using the side information and the absolute value of the difference value, but the mode may be determined using only the mode information or only an absolute sum of a prediction error signal, or values obtained by performing a Hadamard transform or approximation of these pieces of information may be used. In addition, the coding cost K may be obtained by using the activity of the input image, or the coding cost may be obtained using a quantization scale.

The coding cost K can also be calculated by using Equation (2).

$$K = D + \lambda \times R \quad (2)$$

where a coding distortion D represents a square error between the input image signal and a local decoded image signal, an amount of code R is estimated by tentative coding, and a coefficient $\lambda$ is a constant determined on the basis of a quantization parameter.

When the coding cost is calculated by using Equation (2), the image coding device 10 needs entropy coding and local decoding (including dequantization and inverse transform processing) for each mode. Thus, though a circuit scale is increased, an accurate amount of code and accurate coding distortion can be used, and the coding efficiency can be maintained at a high level.

Description will next be made of a DCT performed in the H.264/AVC system as a method of a one-dimensional DCT along a prediction direction. Letting X be the input image signal and letting T be a transform matrix for a sub-block of 4×4 pixels, a transform coefficient C is obtained according to Equation (3).

$$C = T \cdot X \cdot T^t \quad (3)$$

where $$T = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$$

That is, the input image signal is subjected to a one-dimensional DCT in the horizontal direction using the transform matrix T, and thereafter subjected to a one-dimensional DCT in the vertical direction using the transposed matrix $T^t$ of the transform matrix T. This operation also applies to a sub-block of 8×8 pixels.

Next, a DCT along a prediction direction is performed for the prediction modes in the six directions excluding the three types of the prediction mode 0 (vertical), the prediction mode 1 (horizontal), and the prediction mode 2 (DC) among the nine types of prediction modes of intra-frame prediction defined in the H.264/AVC system.

Description in the following will be made of a case in which a DCT along a prediction direction is performed for the sub-block of 4×4 pixels shown in FIG. 9. In the case of the prediction mode 3, the pixels within the sub-block are grouped into seven sets of (a), (b, e), (c, f, i), (d, g, j, m), (h, k, n), (l, o), and (p) along the prediction direction.

Figure 11A:
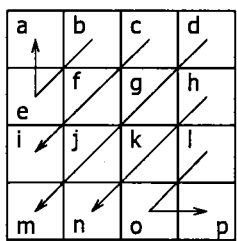
FIGS. 11A, 11B, and 11C are diagrams of assistance in explaining one-dimensional DCTs in a case of a prediction mode 3.

FIG. 11A shows a combination of pixel strings in which a one-dimensional DCT is performed. Letting F(u) be a transform coefficient, a one-dimensional DCT with a base length of four is performed for the pixel string (d, g, j, m) present in a diagonal line of the 4×4 pixel block.

Equation (4) represents the transform coefficient F(u) when the base length is "N."

$$F(u) = \sqrt{\frac{2}{N}} C(u) \sum_{x=0}^{N-1} f(x) \cos\left\{\frac{\pi(2x+1)u}{2N}\right\} \quad (4)$$

When the transform coefficient F(u) is obtained for the pixel string (d, g, j, m), the transform coefficient F(u) can be obtained by performing the operation of Equation (4) with the base length "N=4" and with "f(0)=d, f(1)=g, f(2)=j, and f(3)=m."

When the transform coefficient F(u) is obtained for the pixel string (c, f, i), the transform coefficient F(u) can be obtained by performing the operation of Equation (4) with the base length "N=3" and with "f(0)=c, f(1)=f, and f(2)=i."

For the pixel (a) and the pixel string (b, e), the transform coefficient F(u) is obtained with the pixels combined with each other in a folded-back manner. In this case, the transform coefficient F(u) can be obtained by performing the operation of Equation (4) with the base length "N=3" and with "f(0)=b, f(1)=e, and f(2)=a" or "f(0)=e, f(1)=b, and f(2)=a."

Figure 11B:
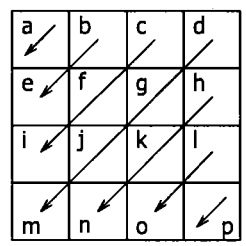

FIG. 11B represents a case in which a one-dimensional DCT is performed without pixels combined with each other in a folded-back manner. A one-dimensional DCT similar to that of FIG. 11A is performed for the pixel strings (d, g, j, m) and (c, f, i). A one-dimensional DCT is performed for each of the pixel string (b, e) and the pixel (a) without the pixels being combined with each other in a folded-back manner. Specifically, when the transform coefficient F(u) is obtained for the pixel string (b, e), the transform coefficient F(u) can be obtained by performing the operation of Equation (4) with the base length "N=2" and with "f(0)=b and f(1)=e." When the transform coefficient F(u) is obtained for the pixel (a), the transform coefficient F(u) can be obtained by performing the operation of Equation (4) with the base length "N=1" and with "f(0)=a."

Figure 11C:
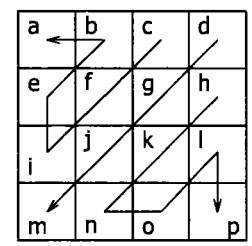

FIG. 11C represents a case in which a one-dimensional DCT is performed with all of the pixel strings (c, f, i) and (e, b) and the pixel (a) combined with each other in a folded-back manner. A one-dimensional DCT similar to that of FIG. 11A is performed for the pixel string (d, g, j, m). For the pixel strings (c, f, i) and (e, b) and the pixel (a), a one-dimensional DCT is performed with the pixels combined with each other in a folded-back manner. Specifically, when the transform coefficient F(u) is obtained for the pixel string (c, f, i, e, b, a), the transform coefficient F(u) can be obtained by performing the operation of Equation (4) with the base length "N=6" and with "f(0)=c, f(1)=f, f(2)=i, f(3)=e, f(4)=b, and f(5)=a" or "f(0)=i, f(1)=f, f(2)=c, f(3)=b, f(4)=e, and f(5)=a." Incidentally, the transform coefficient F(u) can be obtained in a similar manner for the pixel strings (h, k, n) and (l, o) and the pixel (p).

In the case of the prediction mode 4, it can be considered that the prediction direction of the prediction mode 3 is horizontally reversed in the prediction mode 4, and therefore DCT operation can be performed in a similar manner to that of the prediction mode 3.

Figure 12A:
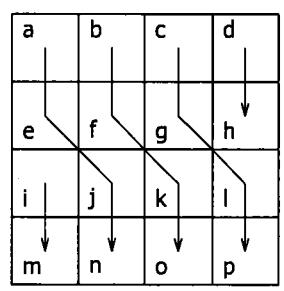
FIGS. 12A and 12B are diagrams of assistance in explaining one-dimensional DCTs in a case of a prediction mode 5.

Description will next be made of a DCT operation method corresponding to the prediction modes 5 to 8. In the case of the prediction mode 5, the pixels within the sub-block are grouped into five sets of pixel strings (a, e, j, n), (b, f, k, o), (c, g, l, p), (i, m), and (d, h) along the prediction direction. FIG. 12A shows the combination of the pixel strings to which a one-dimensional DCT is applied. When the transform coefficient F(u) is obtained for the pixel string (a, e, j, n), the transform coefficient F(u) can be obtained by performing the operation of Equation (4) with the base length "N=4" and with "f(0)=a, f(1)=e, f(2)=j, and f(3)=n." For the pixel strings (b, f, k, o) and (c, g, l, p), the transform coefficient F(u) can be obtained by performing similar operation.

When the transform coefficient F(u) is obtained for the pixel string (i, m), the transform coefficient F(u) can be obtained by performing the operation of Equation (4) with the base length "N=2" and with "f(0)=i and f(1)=m." For the pixel string (d, h), the transform coefficient F(u) can be obtained by performing similar operation.

Figure 12B:
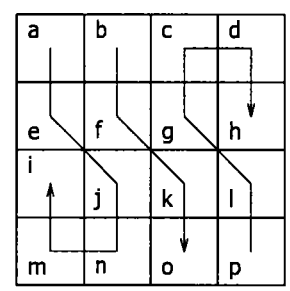

In addition, a method of performing a one-dimensional DCT with pixels combined with each other in a folded-back manner can be considered as another example of DCT operation corresponding to the prediction mode 5. FIG. 12B shows a combination of pixel strings to which a one-dimensional DCT is applied in this case. A one-dimensional DCT similar to that of the above-described one-dimensional DCT is performed for the pixel string (b, f, k, o). For the pixel strings (a, e, j, n) and (m, i) and the pixel strings (p, l, g, c) and (d, h), a one-dimensional DCT is performed with the pixels combined with each other in a folded-back manner. Specifically, when the transform coefficient F(u) is obtained for the pixel string (a, e, j, n, m, i), the transform coefficient F(u) can be obtained by performing the operation of Equation (4) with the base length "N=6" and with "f(0)=a, f(1)=e, f(2)=j, f(3)=n, f(4)=m, and f(5)=i." In addition, the transform coefficient F(u) can be obtained by performing similar operation for the pixel strings (p, l, g, c) and (d, h).

In the case of the prediction modes 6 to 8, it can be considered that the prediction direction of the prediction mode 5 is rotated or reversed in the prediction modes 6 to 8, and therefore DCT operation can be performed in a similar manner to that of the prediction mode 5.

In addition, as for the block size of sub-blocks as coding objects, the coding process can also be performed with blocks of smaller sizes than the 4×4 pixel size or blocks of larger sizes than the 4×4 pixel size as sub-blocks. In addition, the DCT operation is not limited to real-number DCT operation, but the DCT can also be performed by integer operation.

Figure 14:
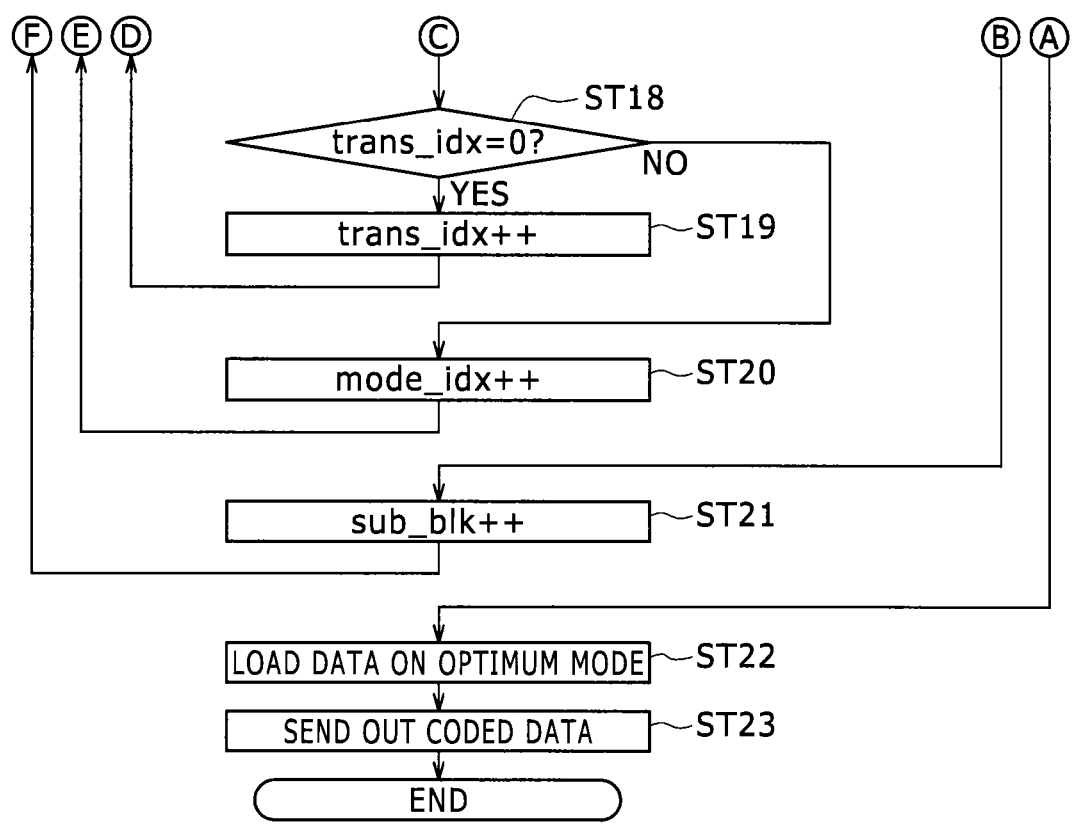
FIG. 14 is a flowchart (2/2) showing the operation of the image coding device in the first embodiment.

FIG. 13 and FIG. 14 are flowcharts of operation of the image coding device 10 in the first embodiment. Incidentally, suppose that the prediction modes 0 to 8 shown in FIGS. 10A to 10I are provided in the coding process.

In step ST1, the image coding device 10 obtains an input image. The image coding device 10 obtains an input image signal DS1, and starts coding in each macroblock or each macroblock pair.

In step ST2, the image coding device 10 performs initialization relating to sub-blocks. The image coding device 10 initializes a sub-block index sub_blk to "sub_blk=0" and sets a maximum sub-block number MAX_SUB_BLK at the same time. The image coding device 10 then proceeds to step ST3.

In step ST3, the image coding device 10 determines whether the sub-block index sub_blk is smaller than the maximum sub-block number MAX_SUB_BLK. When the sub-block index sub_blk is smaller than the maximum sub-block number MAX_SUB_BLK, there is a sub-block yet to be coded among sub-blocks within a macroblock, and therefore the image coding device 10 proceeds to step ST4. When the sub-block index sub_blk is not smaller than the maximum sub-block number MAX_SUB_BLK, there is no sub-block yet to be coded among the sub-blocks within the macroblock, and therefore the image coding device 10 proceeds to step ST22.

In step ST4, the image coding device 10 performs initialization relating to prediction modes. The image coding device 10 initializes a prediction mode index mode_idx to "mode_idx=0," and sets a maximum selectable mode number MAX_MODE. For example, when nine prediction modes, or the prediction modes 0 to 8, are provided, "MAX_MODE=9." Incidentally, a prediction mode index mode_idx=0 corresponds to the prediction mode 0. Similarly, the indexes mode_idx=1 to 8 correspond to the prediction modes 1 to 8.

In step ST5, the image coding device 10 determines whether the prediction mode index mode_idx is smaller than the maximum mode number MAX_MODE. When the prediction mode index mode_idx is smaller than the maximum mode number MAX_MODE, not all intra-frame prediction modes have been tried, and therefore the image coding device 10 proceeds to step ST6. When the prediction mode index mode_idx is not smaller than the maximum mode number MAX_MODE, all the intra-frame prediction modes have been tried, and therefore the image coding device 10 proceeds to step ST21.

In step ST6, the image coding device 10 sets transform information trans_idx. The image coding device 10 sets the transform information trans_idx according to the value of the prediction mode index mode_idx. When the prediction mode index mode_idx indicates an oblique direction prediction mode (prediction mode 3 to 8), the image coding device 10 sets the transform information trans_idx to "trans_idx=0." The image coding device 10 then proceeds to step ST7. When the prediction mode index mode_idx indicates a non-oblique direction prediction mode (prediction mode 0 to 2), the image coding device 10 sets the transform information trans_idx to "trans_idx=1." The image coding device 10 then proceeds to step ST7.

In step ST7, the image coding device 10 generates a predicted image signal in the prediction mode of the index mode_idx. The image coding device 10 generates the predicted image signal in the prediction mode indicated by the index mode_idx using the image signal of a reference image. The image coding device 10 then proceeds to step ST8.

In step ST8, the image coding device 10 generates a prediction error signal. The image coding device 10 generates the prediction error signal DS2 by calculating difference between the predicted image signal DS18 in the generated predicted image signal DS18 in the prediction mode of the index mode_idx and the input image signal DS1. The image coding device 10 then proceeds to step ST9.

In step ST9, the image coding device 10 performs edge detection. The image coding device 10 detects an edge using the image signal of the stored reference image (image signal of a coded adjacent block), and generates an index DS31 indicating the position of the edge and the intensity of the edge. The image coding device 10 then proceeds to step ST10.

In step ST10, the image coding device 10 sets transform blocks. The image coding device 10 estimates the continuity of the edge within the sub-block as a coding object on the basis of the index DS31 indicating the position of the edge and the intensity of the edge and the direction of the prediction mode indicated by the index mode_idx. Further, the image coding device 10 sets transform blocks on the basis of a result of the estimation, and generates transform block setting information DS32. The image coding device 10 then proceeds to step ST11.

In step ST11, the image coding device 10 determines whether the prediction mode index mode_idx is smaller than a minimum mode number mode_direction of an oblique direction prediction mode as a minimum value of the mode numbers of the oblique direction prediction modes, or whether the transform information is "trans_idx=1." The image coding device 10 proceeds to step ST12 in at least one of the cases where the prediction mode index mode_idx is smaller than the minimum mode number mode_direction and where the transform information is "trans_idx=1." Otherwise, the image coding device 10 proceeds to step ST14.

In step ST12, the image coding device 10 performs a horizontal and vertical DCT. The image coding device 10 then proceeds to step ST13. In step ST13, the image coding device 10 performs horizontal and vertical quantization. The image coding device 10 then proceeds to step ST16. The image coding device 10 for example changes the processing selecting switch 12 to the side of the first transform section 13, and performs the DCT and the quantization using the first transform section 13 and the first quantizing section 15.

In step ST14, the image coding device 10 performs an oblique direction pattern DCT. The image coding device 10 then proceeds to step ST15. In step ST15, the image coding device 10 performs oblique direction pattern quantization.

The image coding device 10 then proceeds to step ST16. The image coding device 10 for example changes the processing selecting switch 12 to the side of the second transform section 14. In addition, the image coding device 10 changes the pattern selecting switch 140 in the second transform section 14 and the pattern selecting switch 160 in the second quantizing section 16 according to the prediction mode index mode_idx. The image coding device 10 performs the DCT and the quantization using an oblique direction pattern DCT section and an oblique direction pattern quantizing section corresponding to the prediction direction by changing the switches according to the index mode_idx.

In step ST16, the image coding device 10 performs entropy coding. The image coding device 10 entropy-codes the quantized data DS5 and DS6, the prediction mode information DS20, and the transform information DS40. The image coding device 10 then proceeds to step ST17.

In step ST17, the image coding device 10 stores the coding cost of the prediction mode. The image coding device 10 calculates a cost value K as described above, and stores the calculated cost value K. The image coding device 10 then proceeds to step ST18.

In step ST18, the image coding device 10 determines whether the transform information trans_idx is "trans_idx=0." When the transform information trans_idx is "trans_idx=0," the image coding device 10 proceeds to step ST19. When the transform information trans_idx is not "trans_idx=0," the image coding device 10 proceeds to step ST20.

In step ST19, the image coding device 10 adds "1" to the transform information trans_idx to set new transform information trans_idx. The image coding device 10 then returns to step ST11.

In step ST20, the image coding device 10 adds "1" to the prediction mode index mode_idx to set a new index mode_idx. The image coding device 10 then returns to step ST5.

By similarly repeating the process from step ST5, coding cost is calculated in all possible prediction modes for the sub-block.

Thereafter, when the image coding device 10 determines in step ST5 that the prediction mode index mode_idx is not smaller than the maximum mode number MAX_MODE, the image coding device 10 proceeds to step ST21. In step ST21, the image coding device 10 adds "1" to the sub-block index sub_blk to set a new index sub_blk. The image coding device 10 then returns to step ST3.

When the image coding device 10 determines in step ST3 that the sub-block index sub_blk is not smaller than the maximum sub-block number MAX_SUB_BLK, and therefore proceeds to step ST22, the image coding device 10 loads data on an optimum mode for each sub-block. The image coding device 10 compares the coding costs of the respective modes which coding costs are obtained for each sub-block with each other, and loads data on an optimum mode in each sub-block. The image coding device 10 then proceeds to step ST23. In addition, the image coding device 10 generates the prediction mode information DS20 indicating the optimum mode.

In step ST23, the image coding device 10 multiplexes and sends out coded data obtained by performing coding in the optimum mode in the macroblock. In addition, the image coding device 10 entropy-codes the prediction mode information DS20, that is, the index mode_idx of the optimum mode and the transform information DS40, that is, the transform information trans_idx, and includes the entropy-coded information in the coded data.

Figure 15A:
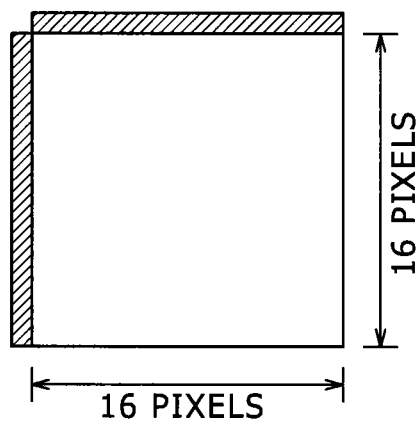
FIGS. 15A, 15B, 15C, 15D, 15E, and 15F are diagrams of assistance in explaining operation of a reference image edge detecting section.
Figure 15B:
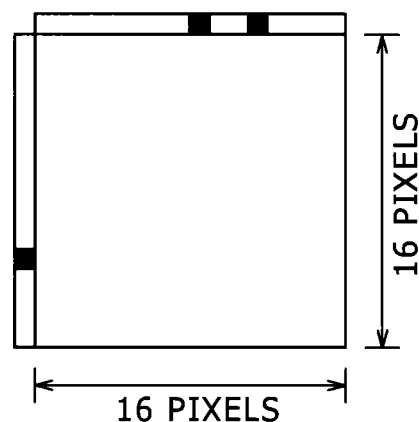

The operation of the reference image edge detecting section 31 will next be described with reference to FIGS. 15A to 15F. FIG. 15A represents a case where the size of a sub-block as a coding object is 16×16 pixels. Parts indicated by hatching in FIG. 15A are the signals of one vertical line and one horizontal line of coded adjacent blocks stored in the reference memory 24. The reference image edge detecting section 31 detects an edge of the signal of each of the one adjacent vertical line and the one adjacent horizontal line represented by the hatched parts, and outputs an index indicating the position of the edge and the intensity of the edge. For example, the reference image edge detecting section 31 applies a one-dimensional Sobel filter, and outputs a signal obtained as a result of applying the one-dimensional Sobel filter. The signal obtained as a result of applying the one-dimensional Sobel filter has information on both the position of the edge and the intensity of the edge. An image of the signal obtained as a result of applying the one-dimensional Sobel filter is shown in FIG. 15B. Incidentally, for the simplicity of description, the signal as a multivalued signal is shown in white and black for convenience, and positions shown in black represent an edge. The format of the index indicating the position of the edge and the intensity of the edge may not be that of the signal obtained as a result of applying the filter. For example, a flag indicating the presence or absence of an edge and data in the form of points indicating the intensity of the edge only at the position of the edge may be obtained. In addition, any method may be used to calculate the index indicating the position of the edge and the intensity of the edge as long as the index can be obtained. For example, a Prewitt filter or a Laplacian filter may be used, or a mathematical or physical method other than filters may be used.

Figure 15C:
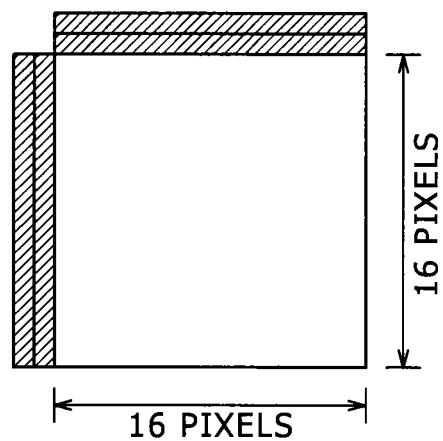
Figure 15D:
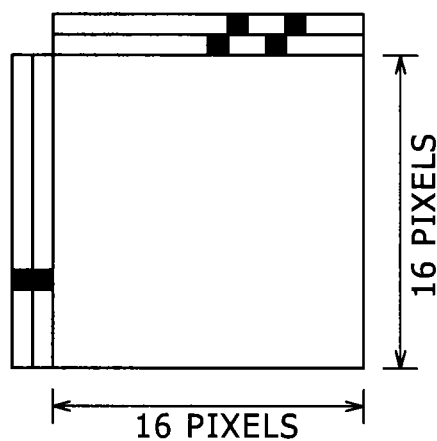
Figure 15E:
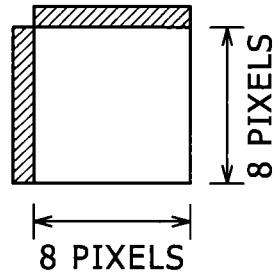
Figure 15F:
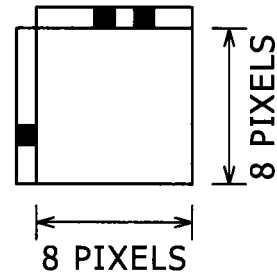

In addition, while the index indicating the position of the edge and the intensity of the edge of the signal of each of the one vertical line and the one horizontal line adjacent to the sub-block as a coding object is obtained in FIGS. 15A and 15B, there is no limitation to this. As shown in FIGS. 15C and 15D, a plurality of lines may be used. Further, a similar process can be applied even when the size of the sub-block is different from the size of 16×16 pixels. For example, as shown in FIGS. 15E and 15F, a similar process can be applied also to a case of 8×8 pixels.

Figure 16A:
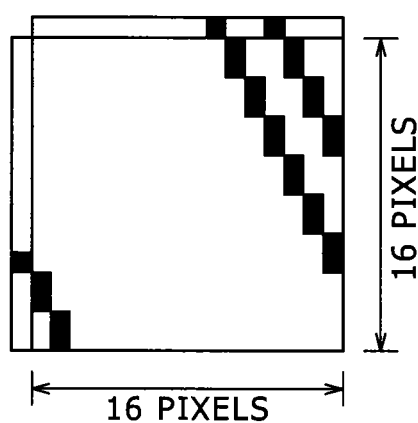
FIGS. 16A, 16B, 16C, and 16D are diagrams of assistance in explaining operation of a transform block setting section.

The operation of the transform block setting section 32 will next be described with reference to FIGS. 16A to 16D. FIG. 16A represents a case where the block size of a sub-block as a coding object is 16×16 pixels. The transform block setting section 32 divides the sub-block on the basis of information indicating the position of an edge and the intensity of the edge and the prediction mode information DS20, and sets transform blocks. The transform block setting section 32 estimates the continuity of the edge within the sub-block as the coding object on the basis of the position of the edge and the prediction mode information DS20. For example, the transform block setting section 32 estimates that edges detected by applying a Sobel filter to the vertical and horizontal lines of adjacent blocks are continuous in a prediction direction indicated by the prediction mode information DS20 as shown in FIG. 16A. Incidentally, FIG. 16A shows a result of estimation of edge continuity when the prediction mode information DS20 indicates the prediction mode 5. In addition, in the figure, for the simplicity of description, a multivalued signal is shown in white and black for convenience, and black parts represent an edge.

Figure 16B:
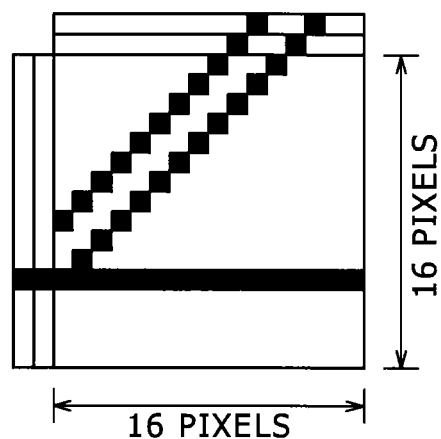

In addition, as shown in FIG. 16B, when the direction of edges can be estimated with the positions and intensities of the edges detected in a plurality of lines in adjacent blocks, it is estimated that the edges are present in directions considered to be more appropriate from the prediction mode and the directions of the edges in the adjacent blocks. For example, the reliability of the prediction mode and the reliability of the directions of the edges in the adjacent blocks are converted into numerical values, and the higher of the numerical values is employed. The conversion of reliability into a numerical value includes a method of making the reliability of an edge in an adjacent block higher when the edge has a high intensity. When the numerical value exceeds a threshold value, the direction of the edge in the adjacent block is employed, for example. FIG. 16B shows an example in which the directions of the edges in the adjacent blocks, rather than the prediction mode 5, are employed.

Figure 16C:
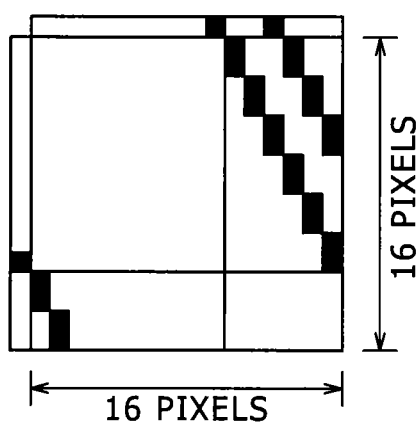

Next, in consideration of the estimated continuity of the edges, the transform block setting section 32 divides the sub-block as a coding object, and sets transform blocks for an orthogonal transform. In this case, the sub-block as a coding object is desirably divided into a plurality of transform blocks such that areas not covering an edge are as large as possible from a viewpoint of coding efficiency. Thus, as shown in FIG. 16C, the transform block setting section 32 divides the sub-block as a coding object horizontally and vertically such that boundaries between blocks after the division do not include an edge. For example, the transform block setting section 32 finds a terminal part of a continuous edge, and determines a boundary of division in such a manner as to be in contact with the terminal part. The transform block setting section 32 sets blocks after the division as transform blocks as units of an orthogonal transform, and generates the transform block setting information DS32 indicating the transform blocks.

In dividing a sub-block, there may be a case in which a plurality of edges are detected and the sub-block cannot be divided such that boundaries of transform blocks do not cover an edge. In that case, the transform block setting section 32 determines the order of priority of edges not to fall on a block boundary from indexes indicating the intensity of the edges. For example, the transform block setting section 32 gives higher priority to a higher-energy signal obtained by the filtering of a Sobel filter. The order of priority may be determined in a relative manner or an absolute manner. The order of priority is thus determined, and division is made such that an edge of high priority does not fall on the boundaries between the transform blocks. In addition, sub-blocks do not necessarily need to be divided in both the horizontal and vertical directions, but may be divided in one of the directions, or may not be divided at all. The blocks after the division may be further divided hierarchically, or division into a plurality of blocks may be made in a same layer. Further, the size of the transform blocks after the division may be limited to sizes of two raised to nth power in consideration of compatibility with ordinary coding systems.

Further, when a signal is output in a different format from the reference image edge detecting section 31, it suffices for the transform block setting section 32 to estimate the continuity of an edge on the basis of a concept similar to that of the above-described procedure according to the signal, and set transform blocks.

Figure 16D:
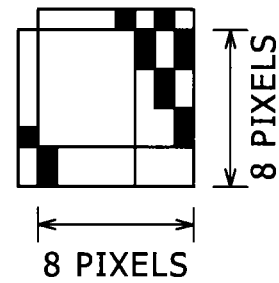

The size of sub-blocks is not limited to the 16×16 pixel size, but a similar process can be applied to other sub-block sizes. For example, as shown in FIG. 16D, a similar process can be applied to a sub-block size of 8×8 pixels.

FIG. 17 represents a procedure for setting transform blocks using the reference image edge detecting section 31 and the transform block setting section 32. In step ST31, the reference image edge detecting section 31 obtains an index indicating the position of an edge in a reference image adjacent to a sub-block as a coding object and the intensity of the edge. The process then proceeds to step ST32.

In step ST32, the transform block setting section 32 estimates the continuity of the edge within the sub-block as the coding object on the basis of the index indicating the position of the edge and the intensity of the edge and the prediction mode information DS20 obtained from the predicting section 25. The process then proceeds to step ST33.

In step ST33, the transform block setting section 32 sets transform blocks in consideration of the estimated continuity of the edge and the intensity of the edge.

After the transform blocks are thus set in the transform block setting section 32, the first transform section 13, the first quantizing section 15, the first dequantizing section 19, and the first inverse transform section 21 perform a DCT, quantization, dequantization, and an inverse DCT in each of the set transform blocks.

In addition, the second transform section 14, the second quantizing section 16, the second dequantizing section 20, and the second inverse transform section 22 perform a DCT, quantization, dequantization, and an inverse DCT in the prediction direction corresponding to the prediction mode information DS20 in each of the set transform blocks. FIGS. 18A to 18E represent a case in which a sub-block has a block size of 8×8 pixels, and the sub-block is divided into four parts, which are set as transform blocks, as shown in FIG. 16D. For example, the sub-block of 8×8 pixels shown in FIG. 18A is divided into transform blocks of 5×6 pixels, 3×6 pixels, 5×2 pixels, and 3×2 pixels, as shown in FIGS. 18B to 18E. In addition, suppose that the prediction mode is the mode 5. In this case, signals within the blocks are scanned and DCTs are performed in consideration of correlation present in a vertical oblique direction. For example, scans as indicated by arrows in FIGS. 18B to 18E are performed, and DCTs are performed according to the respective numbers of continuous pixels.

Incidentally, the orthogonal transform is not limited to DCTs, but may for example be wavelet transforms, Hadamard transforms, or transforms obtained by reducing the wavelet transforms and the Hadamard transforms to integer precision. It suffices to use a method appropriate for an orthogonal transform also employing quantization.

[1-3. Configuration of Image Decoding Device]

Description will next be made of an image decoding device that decodes the coded data generated by the image coding device 10.

Figure 19:
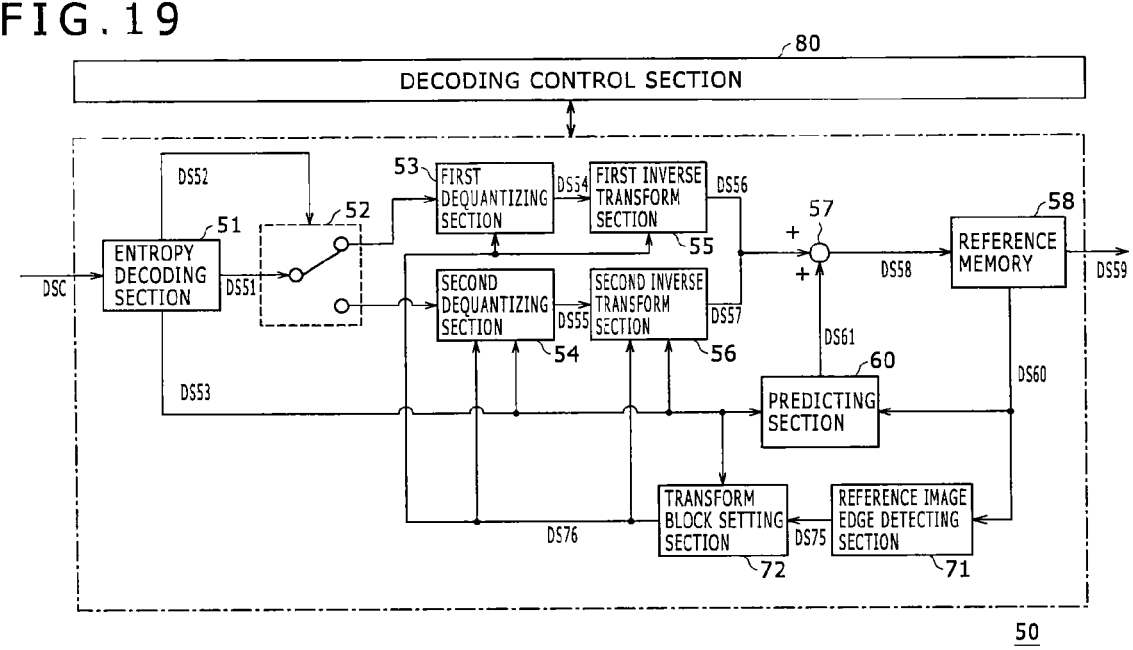
FIG. 19 is a diagram showing a configuration of an image decoding device in the first embodiment.

FIG. 19 shows a configuration of the image decoding device 50 in the first embodiment. The image decoding device 50 includes an entropy decoding section 51, a processing selecting switch 52, a first dequantizing section 53, a second dequantizing section 54, a first inverse transform section 55, a second inverse transform section 56, an arithmetic section 57, a reference memory 58, and a predicting section 60. The image decoding device 50 also includes a reference image edge detecting section 71, a transform block setting section 72, and a decoding control section 80.

The entropy decoding section 51 entropy-decodes the coded data DSC received as input. The entropy decoding section 51 performs entropy decoding corresponding to the entropy coding performed in the entropy coding section 17 in the image coding device 10. The entropy decoding section 51 outputs quantized data DS51 and transform information DS52 (corresponding to DS40) obtained by performing the entropy decoding to the processing selecting switch 52. The entropy decoding section 51 also outputs prediction mode information DS53 (corresponding to DS20) obtained by performing the entropy decoding to the predicting section 60.

The processing selecting switch 52 performs switching on the basis of the transform information DS52 supplied from the entropy decoding section 51 to output the quantized data DS51 to the first dequantizing section 53 or the second dequantizing section 54.

The first dequantizing section 53 is configured in a similar manner to the first dequantizing section 19 in the image coding device 10. The first dequantizing section 53 dequantizes the quantized data DS51 supplied via the processing selecting switch 52. In addition, the first dequantizing section 53 dequantizes the quantized data in each transform block based on transform block setting information DS76 supplied from the transform block setting section 72. The first dequantizing section 53 outputs transform coefficients DS54 obtained by performing the dequantization to the first inverse transform section 55.

The first inverse transform section 55 is configured in a similar manner to the first inverse transform section 21 in the image coding device 10. The first inverse transform section 55 applies an inverse DCT in the horizontal and vertical directions to the transform coefficients DS54 supplied from the first dequantizing section 53 in each transform block based on the transform block setting information DS76 supplied from the transform block setting section 72. The first inverse transform section 55 outputs a prediction error signal DS56 obtained by performing the inverse DCT to the arithmetic section 57.

The second dequantizing section 54 is configured in a similar manner to the second dequantizing section 20 in the image coding device 10. The second dequantizing section 54 dequantizes the quantized data DS51 supplied via the processing selecting switch 52 in an oblique direction pattern dequantizing section corresponding to a prediction direction indicated by the transform information DS52. In addition, the second dequantizing section 54 dequantizes the quantized data in each transform block based on the transform block setting information DS76 supplied from the transform block setting section 72. The second dequantizing section 54 outputs transform coefficients DS55 obtained by performing the dequantization to the second inverse transform section 56.

The second inverse transform section 56 is configured in a similar manner to the second inverse transform section 22 in the image coding device 10. The second inverse transform section 56 performs an inverse DCT of the transform coefficients DS55 supplied from the second dequantizing section 54 in an oblique direction pattern inverse DCT section corresponding to the prediction direction indicated by the transform information DS52. In addition, the second inverse transform section 56 performs an inverse DCT in each transform block based on the transform block setting information DS76 supplied from the transform block setting section 72. The second inverse transform section 56 outputs a prediction error signal DS57 obtained by performing the inverse DCT to the arithmetic section 57.

The arithmetic section 57 generates an image signal DS58 by adding a predicted image signal DS61 generated in the predicting section 60 to the prediction error signal DS56 supplied from the first inverse transform section 55 or the prediction error signal DS57 supplied from the second inverse transform section 56. The arithmetic section 57 stores the generated image signal DS58 in the reference memory 58.

The image signal DS58 stored in the reference memory 58 is supplied to the predicting section 60 and the reference image edge detecting section 71. In addition, the reference image signal stored in the reference memory 58 is sequentially output as an output image signal DS59 from the image decoding device 50.

The predicting section 60 performs prediction in a prediction mode indicated by the prediction mode information DS53 using the reference image signal DS60 read from the reference memory 58, generates a predicted image signal DS61, and outputs the predicted image signal DS61 to the arithmetic section 57.

The reference image edge detecting section 71 is configured in a similar manner to the reference image edge detecting section 31 in the image coding device 10. The reference image edge detecting section 71 detects an edge using the image signal of the decoded adjacent block stored in the reference memory 58, and outputs an index DS75 indicating the position of the edge and the intensity of the edge to the transform block setting section 72.

The transform block setting section 72 is configured in a similar manner to the transform block setting section 32 in the image coding device 10. The transform block setting section 72 estimates the continuity of the edge in a block as a decoding object on the basis of the index DS75 supplied from the reference image edge detecting section 71 and the prediction mode information DS53 supplied from the entropy decoding section 51. The transform block setting section 72 sets transform blocks in performing an inverse orthogonal transform and dequantization from a result of the estimation, and generates the transform block setting information DS76 indicating the transform blocks. The transform block setting section 72 outputs the generated transform block setting information DS76 to the first dequantizing section 53, the second dequantizing section 54, the first inverse transform section 55, and the second inverse transform section 56.

The decoding control section 80 issues control instructions in the process of decoding the coded data and the like.

[1-4. Operation of Image Decoding Device]

Figure 20:
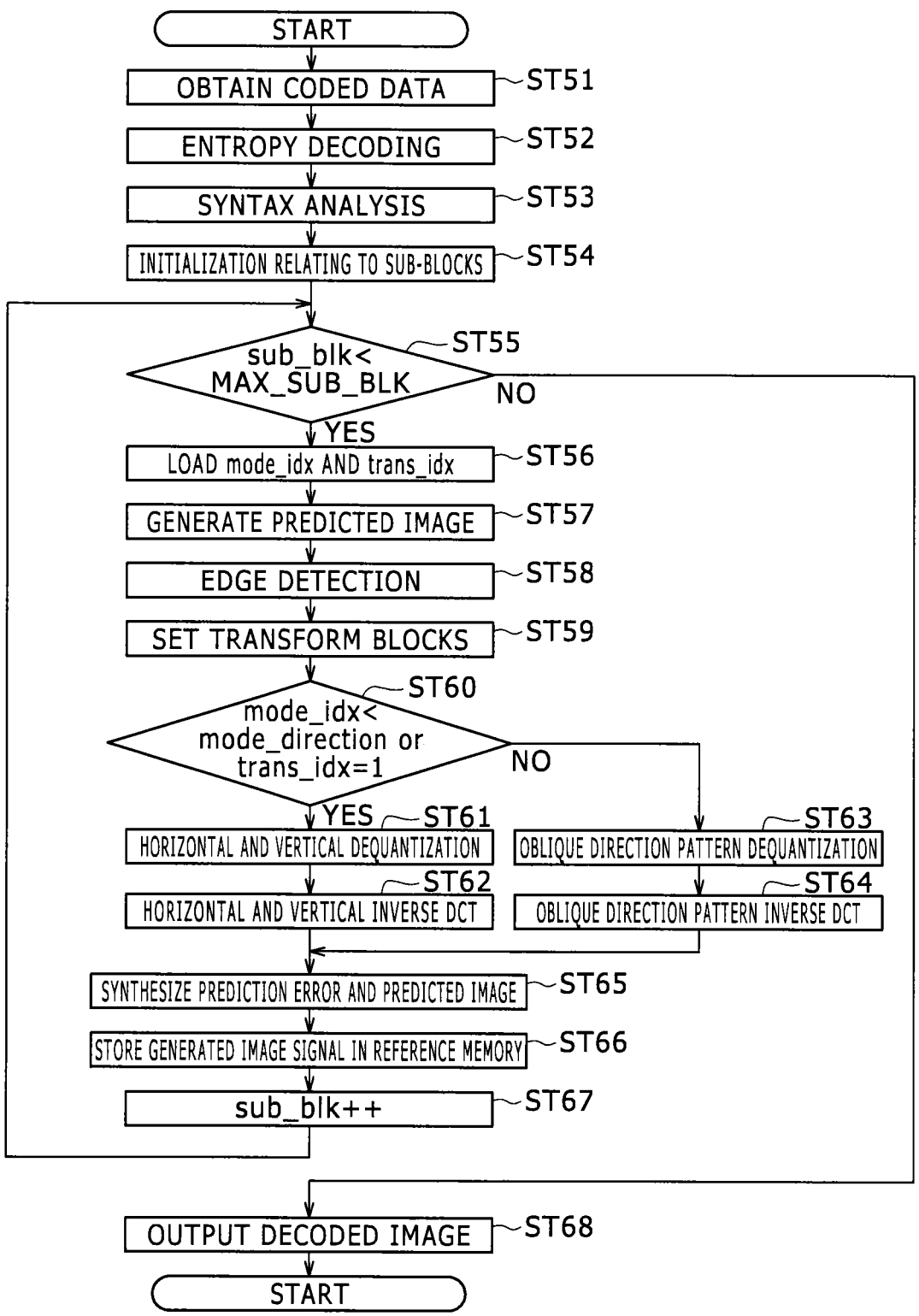
FIG. 20 is a flowchart showing operation of the image decoding device in the first embodiment.

FIG. 20 is a flowchart of operation of the image decoding device 50 in the first embodiment. In step ST51, the image decoding device 50 obtains coded data. The image decoding device 50 obtains the coded data DSC, and starts decoding in each macroblock or each macroblock pair. The image decoding device 50 then proceeds to step ST52.

In step ST52, the image decoding device 50 performs entropy decoding. The image decoding device 50 decodes the variable-length code of each syntax of the coded data DSC, and reproduces quantized data DS51, transform information DS52, and prediction mode information DS53. The image decoding device 50 then proceeds to step ST53.

In step ST53, the image decoding device 50 performs syntax analysis. The image decoding device 50 analyzes the syntaxes from the data obtained by performing the decoding. The image decoding device 50 then proceeds to step ST54.

In step ST54, the image decoding device 50 performs initialization relating to sub-blocks. The image decoding device 50 initializes a sub-block index sub_blk to "sub_blk=0" and sets a maximum sub-block number MAX_SUB_BLK at the same time. The image decoding device 50 then proceeds to step ST55.

In step ST55, the image decoding device 50 determines whether the sub-block index sub_blk is smaller than the maximum sub-block number MAX_SUB_BLK. When the sub-block index sub_blk is smaller than the maximum sub-block number MAX_SUB_BLK, there is a sub-block yet to be decoded among sub-blocks within a macroblock, and therefore the image decoding device 50 proceeds to step ST56. When the sub-block index sub_blk is not smaller than the maximum sub-block number MAX_SUB_BLK, there is no sub-block yet to be decoded among the sub-blocks within the macroblock, and therefore the image decoding device 50 proceeds to step ST68.

In step ST56, the image decoding device 50 loads an index mode_idx and transform information trans_idx. The image decoding device 50 extracts the index mode_idx and the transform information trans_idx from the coded data. The image decoding device 50 then proceeds to step ST57.

In step ST57, the image decoding device 50 generates a predicted image. The image decoding device 50 generates a predicted image signal DS61 in the prediction mode indicated by the index mode_idx using the image signal of a reference image, that is, the stored image signal of a decoded adjacent block. The image decoding device 50 then proceeds to step ST58.

In step ST58, the image decoding device 50 detects an edge. The image decoding device 50 detects an edge using the stored image signal of the decoded adjacent block, and generates an index DS75 indicating the position of the edge and the intensity of the edge. The image decoding device 50 then proceeds to step ST59.

In step ST59, the image decoding device 50 sets transform blocks. The image decoding device 50 estimates the continuity of the edge within the sub-block as a decoding object on the basis of the index DS75 indicating the position of the edge and the intensity of the edge and the prediction direction of the index mode_idx. Further, the image decoding device 50 divides the sub-block on the basis of a result of the estimation of the edge continuity, and sets transform blocks. The image decoding device 50 then proceeds to step ST60.

In step ST60, the image decoding device 50 determines whether the prediction mode index mode_idx is smaller than a minimum mode number mode_direction of an oblique direction prediction mode as a minimum value of the mode numbers of the oblique direction prediction modes, or whether the transform information is "trans_idx=1." The image decoding device 50 proceeds to step ST61 in at least one of the cases where the prediction mode index mode_idx is smaller than the minimum mode number mode_direction and where the transform information is "trans_idx=1." Otherwise, the image decoding device 50 proceeds to step ST63.

In step ST61, the image decoding device 50 performs horizontal and vertical dequantization. The image decoding device 50 then proceeds to step ST62. In step ST62, the image decoding device 50 performs a horizontal and vertical inverse DCT. The image decoding device 50 then proceeds to step ST65. The image decoding device 50 for example changes the processing selecting switch 52 to the side of the first dequantizing section 53, and performs the dequantization and the inverse DCT using the first dequantizing section 53 and the first inverse transform section 55.

In step ST63, the image decoding device 50 performs oblique direction pattern dequantization. The image decoding device 50 then proceeds to step ST64. In step ST64, the image decoding device 50 performs an oblique direction pattern inverse DCT. The image decoding device 50 then proceeds to step ST65. The image decoding device 50 for example changes the processing selecting switch 52 to the side of the second dequantizing section 54. The image decoding device 50 changes pattern selecting switches in the second dequantizing section 54 and the second inverse transform section 56 according to the prediction mode index mode_idx, and performs the dequantization and the inverse DCT using an oblique direction pattern dequantizing section and an oblique direction pattern inverse DCT section corresponding to the prediction direction.

In step ST65, the image decoding device 50 synthesizes a prediction error and a predicted image. The image decoding device 50 generates an image signal DS58 by adding the predicted image signal DS61 to the prediction error signal DS56 or the prediction error signal DS57. The image decoding device 50 then proceeds to step ST66.

In step ST66, the image decoding device 50 stores the generated image signal DS58 in the reference memory. The image decoding device 50 stores the generated image signal DS58 in the reference memory 58. The image decoding device 50 then proceeds to step ST67.

In step ST67, the image decoding device 50 adds "1" to the sub-block index sub_blk to set a new index sub_blk. The image decoding device 50 then returns to step ST55.

In addition, when the image decoding device 50 determines in step ST55 that the sub-block index sub_blk is not smaller than the maximum sub-block number MAX_SUB_BLK, and therefore proceeds to step ST68, the image decoding device 50 outputs a decoded image. The image decoding device 50 outputs the image signal stored in the reference memory 58 after completion of the decoding of the sub-blocks as the image signal of the decoded image.

Thus, according to the first embodiment, in the image coding device 10, the reference image edge detecting section 31 performs edge detection using the image signal of a reference image for a coding object block. In addition, on the basis of a result of the edge detection, the transform block setting section 32 divides the coding object block such that boundaries between blocks after the division do not include an edge, and sets transform blocks. Further, a coding processing section formed by the first transform section 13, the second transform section 14, the first quantizing section 15, the second quantizing section 16, and the like performs processing including an orthogonal transform in each transform block, and generates coded data. In addition, in the image decoding device 50, the reference image edge detecting section 71 performs edge detection using the image signal of a reference image for a decoding object block. In addition, on the basis of a result of the edge detection, the transform block setting section 72 divides the decoding object block such that boundaries between blocks after the division do not include an edge, and sets transform blocks equal to those of the image coding device 10. Further, a decoding processing section formed by the first dequantizing section 53, the second dequantizing section 54, the first inverse transform section 55, the second inverse transform section 56, and the like performs processing including an inverse orthogonal transform in each transform block, and generates an image signal. Further, the transform blocks are set in consideration of edge continuity on the basis of a mode of intra-frame prediction. It is therefore possible to prevent a continuous edge from straddling a plurality of transform blocks and thus improve subjective image quality. In addition, transform blocks not including an edge are increased, so that energy concentration can be improved. Further, the transform blocks are set to be the same sizes by the same operation performed in the image coding device and the image decoding device. Thus, even when information on the transform blocks is not included in the coded data DSC, the coded data DSC can be decoded, so that coding efficiency can be improved.

<2. Second Embodiment>

Description will next be made of a second embodiment. The foregoing first embodiment improves coding efficiency by not including transform block setting information indicating transform blocks changing adaptively in the coded data. However, the image decoding device needs to be provided with a transform block setting section in order to perform a decoding process correctly even when the transform block setting information is not included in the coded data. Accordingly, in the second embodiment, description will be made of a case in which the configuration of the image decoding device is simplified by tolerating a slight decrease in coding efficiency.

[2-1. Configuration of Image Coding Device]

Figure 21:
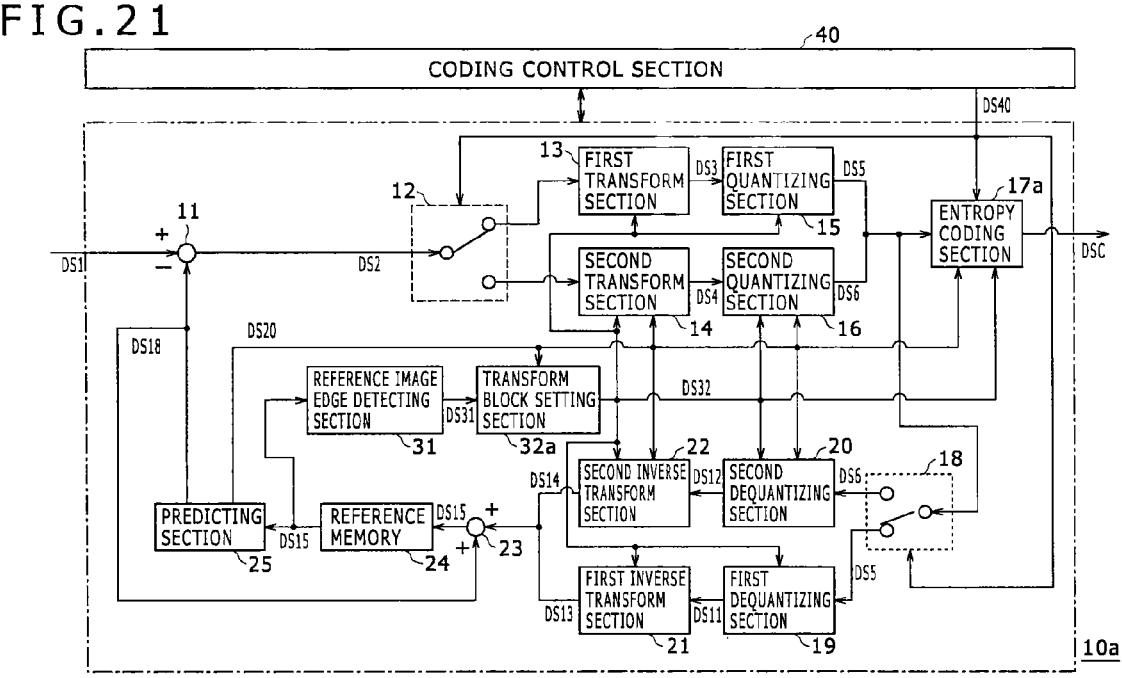
FIG. 21 is a diagram showing a configuration of an image coding device in a second embodiment.

FIG. 21 shows a configuration of an image coding device 10a according to the second embodiment. Incidentally, in FIG. 21, constituent elements corresponding to those of the image coding device 10 according to the first embodiment are identified by the same reference numerals.

The image coding device 10a includes an arithmetic section 11, a processing selecting switch 12, a first transform section 13, a second transform section 14, a first quantizing section 15, a second quantizing section 16, and an entropy coding section 17a. The image coding device 10a also includes a processing selecting switch 18, a first dequantizing section 19, a second dequantizing section 20, a first inverse transform section 21, a second inverse transform section 22, an arithmetic section 23, a reference memory 24, and a predicting section 25. The image coding device 10a further includes a reference image edge detecting section 31, a transform block setting section 32a, and a coding control section 40.

The arithmetic section 11 calculates the prediction error of a predicted image with respect to an input image by subtracting a predicted image signal DS18 generated in the predicting section 25 to be described later from an input image signal DS1. The arithmetic section 11 outputs a prediction error signal DS2 indicating the prediction error to the processing selecting switch 12.

The processing selecting switch 12 performs switching on the basis of transform information DS40 supplied from the coding control section 40 to output the prediction error signal DS2 to the first quantizing section 15 or the second quantizing section 16.

The first transform section 13 performs a horizontal and vertical DCT of the prediction error signal DS2 supplied from the processing selecting switch 12. In addition, the first transform section 13 performs a horizontal and vertical DCT in each transform block based on transform block setting information DS32 supplied from the transform block setting section 32a, and outputs resulting transform coefficients DS3 to the first quantizing section 15.

The first quantizing section 15 quantizes the transform coefficients DS3 output from the first transform section 13, and outputs quantized data DS5 to the entropy coding section 17a and the processing selecting switch 18. In addition, the first quantizing section 15 quantizes the transform coefficients DS3 in each transform block on the basis of the transform block setting information DS32 supplied from the transform block setting section 32a.

The second transform section 14 applies a DCT in a prediction direction based on prediction mode information DS20 from the predicting section 25 to the prediction error signal DS2 supplied from the processing selecting switch 12. In addition, the second transform section 14 performs a DCT in the prediction direction in each transform block based on the transform block setting information DS32 supplied from the transform block setting section 32a, and outputs resulting transform coefficients DS4 to the second quantizing section 16.

The second quantizing section 16 quantizes the transform coefficients DS4 supplied from the second transform section 14 in the prediction direction on the basis of the prediction mode information DS20 from the predicting section 25, and outputs quantized data DS6 to the entropy coding section 17a and the processing selecting switch 18. In addition, the second quantizing section 16 quantizes the transform coefficients DS4 in each transform block on the basis of the transform block setting information DS32 supplied from the transform block setting section 32a.

The entropy coding section 17a entropy-codes the quantized data DS5 supplied from the first quantizing section 15 or the quantized data DS6 supplied from the second quantizing section 16. In addition, the entropy coding section 17a entropy-codes the prediction mode information DS20 generated in the predicting section 25, the transform information DS40 generated in the coding control section 40, and the transform block setting information DS32 indicating transform blocks set in the transform block setting section 32a. The entropy coding section 17a outputs coded data DSC obtained by performing the entropy coding.

The processing selecting switch 18 selects an inverse transform method on the basis of the transform information DS40 supplied from the coding control section 40, and outputs the quantized data DS5 from the first quantizing section 15 to the first dequantizing section 19 and outputs the quantized data DS6 from the second quantizing section 16 to the second dequantizing section 20.

The first dequantizing section 19 dequantizes the quantized data DS5 supplied via the processing selecting switch 18. In addition, the first dequantizing section 19 dequantizes the quantized data in each transform block corresponding to that of the first quantizing section 15 on the basis of the transform block setting information DS32 supplied from the transform block setting section 32a. The first dequantizing section 19 outputs transform coefficients DS11 obtained by performing the dequantization to the first inverse transform section 21.

The first inverse transform section 21 subjects the transform coefficients DS11 supplied from the first dequantizing section 19 to an inverse DCT in the horizontal and vertical directions which inverse DCT corresponds to the DCT in the horizontal and vertical directions in the first transform section 13. In addition, the first inverse transform section 21 performs an inverse DCT in the horizontal and vertical directions in each transform block based on the transform block setting information DS32 supplied from the transform block setting section 32a. The first inverse transform section 21 outputs a prediction error signal DS13 obtained by performing the inverse DCT to the arithmetic section 23.

The second dequantizing section 20 dequantizes the quantized data DS6 supplied via the processing selecting switch 18. The second dequantizing section 20 performs dequantization in the prediction direction corresponding to that of the second quantizing section 16 on the basis of the prediction mode information DS20 from the predicting section 25. In addition, the second dequantizing section 20 dequantizes the quantized data in each transform block corresponding to that of the second quantizing section 16 on the basis of the transform block setting information DS32 supplied from the transform block setting section 32a. The second dequantizing section 20 outputs transform coefficients DS12 obtained by performing the dequantization to the second inverse transform section 22.

The second inverse transform section 22 performs an inverse DCT of the transform coefficients DS12. The second inverse transform section 22 performs an inverse DCT in the prediction direction corresponding to that of the second transform section 14 on the basis of the prediction mode information DS20 from the predicting section 25. In addition, the second inverse transform section 22 performs an inverse DCT of the transform coefficients in each transform block corresponding to that of the second transform section 14 on the basis of the transform block setting information DS32 supplied from the transform block setting section 32a. The second inverse transform section 22 outputs the prediction error signal DS14 obtained by perform the inverse DCT to the arithmetic section 23.

The arithmetic section 23 generates a reference image signal DS15 by adding the predicted image signal DS18 generated in the predicting section 25 to the prediction error signal DS13 supplied from the first inverse transform section 21 or the prediction error signal DS14 supplied from the second inverse transform section 22. The arithmetic section 23 stores the generated reference image signal DS15 in the reference memory 24.

The reference image signal DS15 stored in the reference memory 24 is supplied to the predicting section 25 and the reference image edge detecting section 31.

The predicting section 25 performs intra-frame prediction in each prediction mode using the reference image signal DS15. In addition, the predicting section 25 determines a prediction mode that maximizes coding efficiency, and generates prediction mode information DS20 indicating the prediction mode that maximizes coding efficiency. The predicting section 25 outputs the generated prediction mode information DS20 to the second transform section 14, the second quantizing section 16, the entropy coding section 17a, the second dequantizing section 20, the second inverse transform section 22, and the transform block setting section 32a. Further, the predicting section 25 generates the predicted image signal DS18 in the prediction mode that maximizes coding efficiency, and outputs the predicted image signal DS18 to the arithmetic sections 11 and 23.

The reference image edge detecting section 31 detects an edge using an image signal of a coded adjacent bock stored in the reference memory 24, and outputs an index DS31 indicating the position of the edge and the intensity of the edge to the transform block setting section 32a.

The transform block setting section 32a estimates the continuity of the edge within a sub-block as a coding object on the basis of the index DS31 supplied from the reference image edge detecting section 31 and the prediction mode information DS20 supplied from the predicting section 25. The transform block setting section 32a sets transform blocks in an orthogonal transform and quantization from a result of the estimation, and generates transform block setting information DS32 indicating the set transform blocks. The transform block setting section 32a outputs the generated transform block setting information DS32 to the first transform section 13, the second transform section 14, the first quantizing section 15, the second quantizing section 16, the first dequantizing section 19, the second dequantizing section 20, the first inverse transform section 21, and the second inverse transform section 22. In addition, the transform block setting section 32a outputs the generated transform block setting information DS32 to the entropy coding section 17a.

The coding control section 40 generates the transform information DS40, and outputs the transform information DS40 to the processing selecting switch 12, the entropy coding section 17a, and the processing selecting switch 18.

[2-2. Operation of Image Coding Device]

The image coding device 10a according to the second embodiment performs the process of the flowchart shown in FIGS. 13 and 14 to generate and output coded data. In addition, the image coding device 10a includes the transform block setting information DS32 for an orthogonal transform in the optimum mode in the data on the optimum mode in the process of loading the data on the optimum mode in step ST22 in FIG. 14. For example, the image coding device 10a entropy-codes the transform block setting information DS32, and thereafter includes the transform block setting information DS32 as a header in the coded data DSC.

[2-3. Configuration of Image Decoding Device]

Description will next be made of an image decoding device that decodes the coded data generated by the image coding device 10a.

Figure 22:
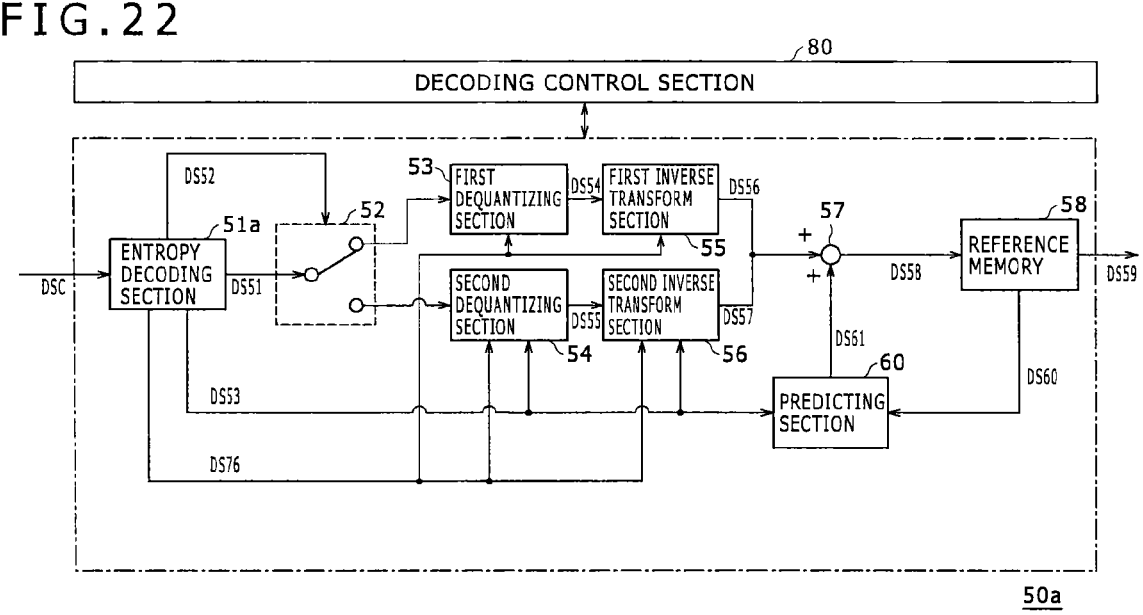
FIG. 22 is a diagram showing a configuration of an image decoding device in the second embodiment.

FIG. 22 shows a configuration of an image decoding device 50a in the second embodiment. Incidentally, in FIG. 22, constituent elements corresponding to those of the image decoding device 50 according to the first embodiment are identified by the same reference numerals.

The image decoding device 50a includes an entropy decoding section 51a, a processing selecting switch 52, a first dequantizing section 53, a second dequantizing section 54, a first inverse transform section 55, a second inverse transform section 56, an arithmetic section 57, a reference memory 58, and a predicting section 60. The image decoding device 50a also includes a decoding control section 80.

The entropy decoding section 51a entropy-decodes the coded data DSC received as input. The entropy decoding section 51a performs entropy decoding corresponding to the entropy coding performed in the entropy coding section 17a in the image coding device 10a. The entropy decoding section 51a outputs quantized data DS51 and transform information DS52 (corresponding to DS40) obtained by performing the entropy decoding to the processing selecting switch 52. The entropy decoding section 51a also outputs prediction mode information DS53 (corresponding to DS20) obtained by performing the entropy decoding to the second dequantizing section 54, the second inverse transform section 56, and the predicting section 60. Further, the entropy decoding section 51a outputs transform block setting information DS76 (corresponding to DS32) obtained by performing the entropy decoding to the first dequantizing section 53, the second dequantizing section 54, the first inverse transform section 55, and the second inverse transform section 56.

The processing selecting switch 52 performs switching on the basis of the transform information DS52 supplied from the entropy decoding section 51a to output the quantized data DS51 to the first dequantizing section 53 or the second dequantizing section 54.

The first dequantizing section 53 is configured in a similar manner to the first dequantizing section 19 in the image coding device 10a. The first dequantizing section 53 dequantizes the quantized data DS51 supplied via the processing selecting switch 52. In addition, the first dequantizing section 53 dequantizes the quantized data in each block based on transform block setting information DS76 supplied from the entropy decoding section 51a. The first dequantizing section 53 outputs transform coefficients DS54 obtained by performing the dequantization to the first inverse transform section 55.

The first inverse transform section 55 is configured in a similar manner to the first inverse transform section 21 in the image coding device 10*a*. The first inverse transform section 55 applies an inverse DCT in the horizontal and vertical directions to the transform coefficients DS54 supplied from the first dequantizing section 53 in each block based on the transform block setting information DS76 supplied from the entropy decoding section 51*a*. The first inverse transform section 55 outputs a prediction error signal DS56 obtained by performing the inverse DCT to the arithmetic section 57.

The second dequantizing section 54 is configured in a similar manner to the second dequantizing section 20 in the image coding device 10*a*. The second dequantizing section 54 dequantizes the quantized data DS51 supplied via the processing selecting switch 52. In addition, the second dequantizing section 54 dequantizes the quantized data in each block based on the transform block setting information DS76 supplied from the entropy decoding section 51*a*. The second dequantizing section 54 outputs transform coefficients DS55 obtained by performing the dequantization to the second inverse transform section 56.

The second inverse transform section 56 is configured in a similar manner to the second inverse transform section 22 in the image coding device 10*a*. The second inverse transform section 56 applies an inverse DCT according to a prediction direction to the transform coefficients DS55 supplied from the second dequantizing section 54 in each block based on the transform block setting information DS76 supplied from the entropy decoding section 51*a*. The second inverse transform section 56 outputs a prediction error signal DS57 obtained by performing the inverse DCT to the arithmetic section 57.

The arithmetic section 57 generates an image signal DS58 by adding a predicted image signal DS61 generated in the predicting section 60 to the prediction error signal DS56 supplied from the first inverse transform section 55 or the prediction error signal DS57 supplied from the second inverse transform section 56. The arithmetic section 57 stores the generated image signal DS58 in the reference memory 58.

The image signal DS58 stored in the reference memory 58 is supplied to the predicting section 60 as a reference image signal DS60. In addition, the reference image signal stored in the reference memory 58 is output as an output image signal DS59 from the image decoding device 50*a*.

The predicting section 60 performs prediction in a prediction mode indicated by the prediction mode information DS53 using the reference image signal DS60 read from the reference memory 58, generates a predicted image signal DS61, and outputs the predicted image signal DS61 to the arithmetic section 57.

The decoding control section 80 issues control instructions in the process of decoding the coded data and the like.

[2-4. Operation of Image Decoding Device]

Figure 23:
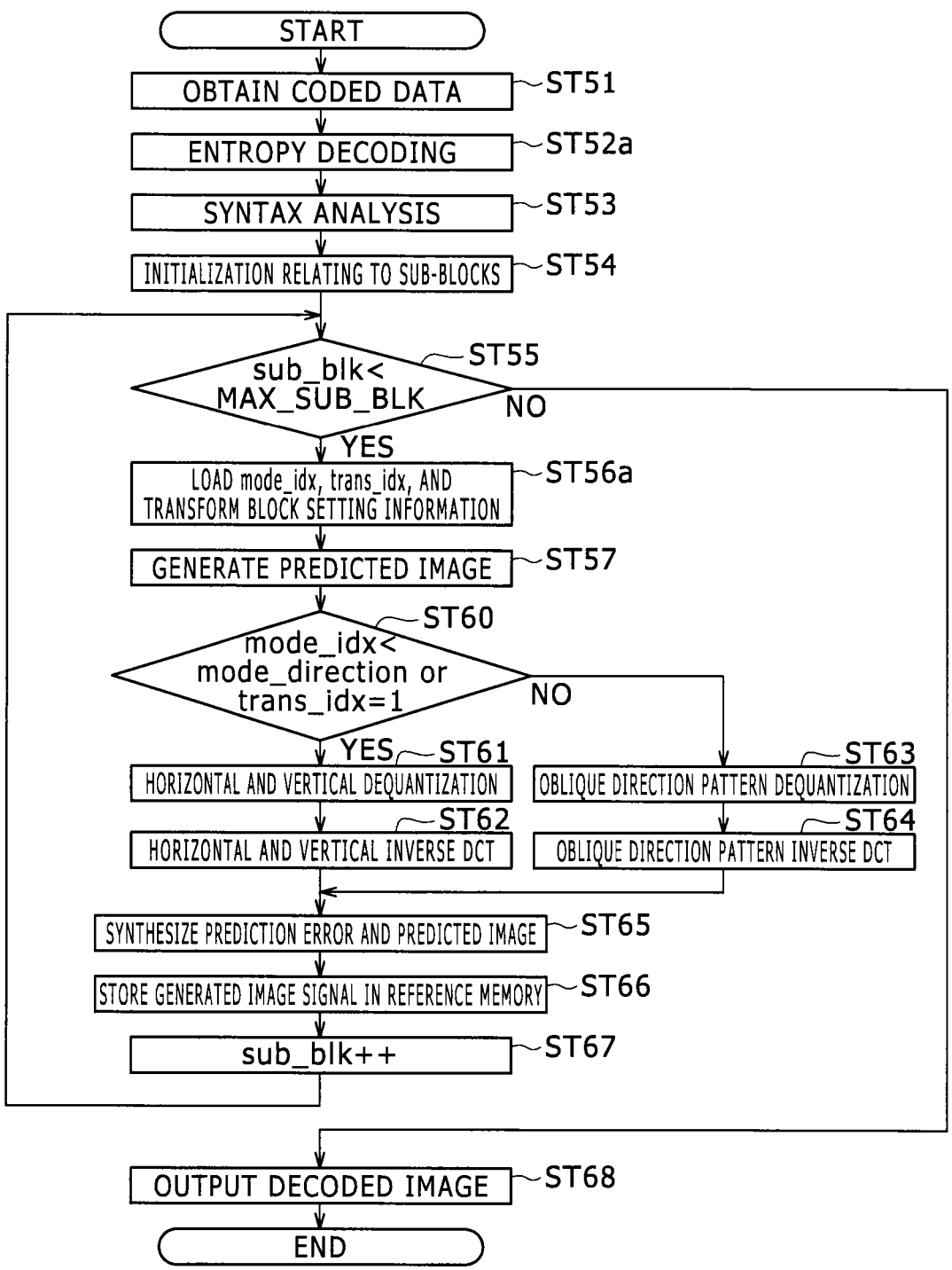
FIG. 23 is a flowchart showing operation of the image decoding device in the second embodiment.

FIG. 23 is a flowchart of operation of the image decoding device 50*a* in the second embodiment. In step ST51, the image decoding device 50*a* obtains coded data. The image decoding device 50*a* obtains the coded data DSC, and starts decoding in each macroblock or each macroblock pair. The image decoding device 50*a* then proceeds to step ST52*a*.

In step ST52*a*, the image decoding device 50*a* performs entropy decoding. The image decoding device 50*a* decodes the variable-length code of each syntax of the coded data DSC, and reproduces quantized data DS51, transform information DS52, prediction mode information DS53, and transform block setting information DS76. The image decoding device 50*a* then proceeds to step ST53.

In step ST53, the image decoding device 50*a* performs syntax analysis. The image decoding device 50*a* analyzes the syntaxes from the data obtained by performing the decoding. The image decoding device 50*a* then proceeds to step ST54.

In step ST54, the image decoding device 50*a* performs initialization relating to sub-blocks. The image decoding device 50*a* initializes a sub-block index sub_blk to "sub_blk=0" and sets a maximum sub-block number MAX_SUB_BLK at the same time. The image decoding device 50*a* then proceeds to step ST55.

In step ST55, the image decoding device 50*a* determines whether the sub-block index sub_blk is smaller than the maximum sub-block number MAX_SUB_BLK. When the sub-block index sub_blk is smaller than the maximum sub-block number MAX_SUB_BLK, there is a sub-block yet to be decoded among sub-blocks within a macroblock, and therefore the image decoding device 50*a* proceeds to step ST56*a*. When the sub-block index sub_blk is not smaller than the maximum sub-block number MAX_SUB_BLK, there is no sub-block yet to be decoded among the sub-blocks within the macroblock, and therefore the image decoding device 50*a* proceeds to step ST68.

In step ST56*a*, the image decoding device 50*a* loads an index mode_idx, transform information trans_idx, and transform block setting information DS76. The image decoding device 50*a* extracts the index mode_idx, the transform information trans_idx, and the transform block setting information DS76 from the coded data. The image decoding device 50*a* then proceeds to step ST57.

In step ST57, the image decoding device 50*a* generates a predicted image. The image decoding device 50*a* generates a predicted image signal DS61 in the prediction mode indicated by the index mode_idx using the image signal of a reference image, that is, the stored image signal of a decoded adjacent block. The image decoding device 50*a* then proceeds to step ST60.

In step ST60, the image decoding device 50*a* determines whether the prediction mode index mode_idx is smaller than a minimum mode number mode_direction of an oblique direction prediction mode as a minimum value of the mode numbers of the oblique direction prediction modes, or whether the transform information is "trans_idx=1." The image decoding device 50*a* proceeds to step ST61 in at least one of the cases where the prediction mode index mode_idx is smaller than the minimum mode number mode_direction and where the transform information is "trans_idx=1." Otherwise, the image decoding device 50*a* proceeds to step ST63.

In step ST61, the image decoding device 50*a* performs horizontal and vertical dequantization. The image decoding device 50*a* then proceeds to step ST62. In step ST62, the image decoding device 50*a* performs a horizontal and vertical inverse DCT. The image decoding device 50*a* then proceeds to step ST65. The image decoding device 50*a* for example changes the processing selecting switch 52 to the side of the first dequantizing section 53, and performs the dequantization and the inverse DCT using the first dequantizing section 53 and the first inverse transform section 55.

In step ST63, the image decoding device 50*a* performs oblique direction pattern dequantization. The image decoding device 50*a* then proceeds to step ST64. In step ST64, the image decoding device 50*a* performs an oblique direction pattern inverse DCT. The image decoding device 50*a* then proceeds to step ST65. The image decoding device 50*a* for example changes the processing selecting switch 52 to the side of the second dequantizing section 54. The image decoding device 50*a* changes pattern selecting switches in the second dequantizing section 54 and the second inverse transform section 56 according to the prediction mode index mode_idx, and performs the dequantization and the inverse DCT using an oblique direction pattern dequantizing section and an oblique direction pattern inverse DCT section corresponding to the prediction direction.

In step ST65, the image decoding device 50*a* synthesizes a prediction error and a predicted image. The image decoding device 50*a* generates an image signal DS58 by adding the predicted image signal DS61 to the prediction error signal DS56 or the prediction error signal DS57. The image decoding device 50*a* then proceeds to step ST66.

In step ST66, the image decoding device 50*a* stores the generated image signal DS58 in the reference memory. The image decoding device 50*a* stores the generated image signal DS58 in the reference memory 58. The image decoding device 50*a* then proceeds to step ST67.

In step ST67, the image decoding device 50*a* adds "1" to the sub-block index sub_blk to set a new index sub_blk. The image decoding device 50*a* then returns to step ST55.

In addition, when the image decoding device 50*a* determines in step ST55 that the sub-block index sub_blk is not smaller than the maximum sub-block number MAX_SUB_BLK, and therefore proceeds to step ST68, the image decoding device 50*a* outputs a decoded image. The image decoding device 50*a* outputs the image signal stored in the reference memory 58 after completion of the decoding of the sub-blocks as the image signal of the decoded image.

Thus, according to the second embodiment, as in the first embodiment, transform blocks are set in consideration of edge continuity on the basis of a mode of intra-frame prediction. It is therefore possible to prevent a continuous edge from straddling a plurality of transform blocks and thus improve subjective image quality. In addition, transform blocks not including an edge are increased, so that energy concentration can be improved. Further, because the transform block setting information on the transform blocks is output in a state of being multiplexed in the coded data, the image decoding device 50*a* does not need to have a reference image edge detecting section for performing edge detection or a transform block setting section for setting the transform blocks on the basis of a result of the edge detection. The configuration of the image decoding device can be simplified as compared with the first embodiment.

<3. Third Embodiment>

The foregoing first and second embodiments set transform blocks on the basis of a result of estimation of the continuity of an edge within a sub-block as a coding object from the edge in an adjacent block. That is, transform blocks are set using an image in a spatial direction as a reference image. However, the reference image is not limited to the spatial direction, but an image in a temporal direction can also be used as a reference image. Description will next be made of a case of using an image in the temporal direction as a reference image as a third embodiment.

[3-1. Configuration of Image Coding Device]

Figure 24:
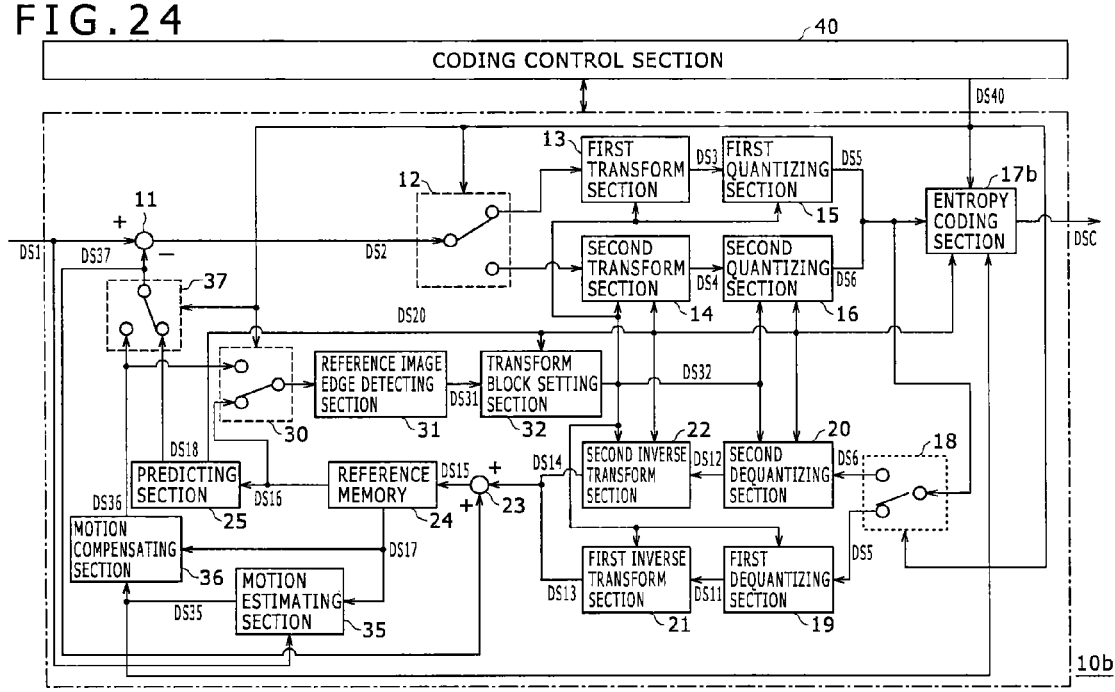
FIG. 24 is a diagram showing a configuration of an image coding device in a third embodiment.

FIG. 24 shows a configuration of an image coding device in the third embodiment. Incidentally, in FIG. 24, constituent elements corresponding to those of the image coding device 10 according to the first embodiment are identified by the same reference numerals.

An image coding device 10*b* includes an arithmetic section 11, a processing selecting switch 12, a first transform section 13, a second transform section 14, a first quantizing section 15, a second quantizing section 16, and an entropy coding section 17*b*. The image coding device 10*b* also includes a processing selecting switch 18, a first dequantizing section 19, a second dequantizing section 20, a first inverse transform section 21, a second inverse transform section 22, an arithmetic section 23, a reference memory 24, a predicting section 25, a reference image edge detecting section 31, and a transform block setting section 32. The image coding device 10*b* further includes an image signal selecting switch 30, a motion estimating section 35 having functions equivalent to those of MPEG and the H.264/AVC system, a motion compensating section 36, a prediction selecting switch 37, and a coding control section 40.

The arithmetic section 11 calculates the prediction error of a predicted image with respect to an input image by subtracting a predicted image signal DS37 as an output of the prediction selecting switch 37 to be described later from an input image signal DS1. The arithmetic section 11 outputs a prediction error signal DS2 indicating the prediction error to the processing selecting switch 12.

The processing selecting switch 12 performs switching on the basis of transform information DS40 supplied from the coding control section 40 to output the prediction error signal DS2 to the first quantizing section 15 or the second quantizing section 16.

The first transform section 13 performs a horizontal and vertical DCT of the prediction error signal DS2 supplied from the processing selecting switch 12. In addition, the first transform section 13 performs a horizontal and vertical DCT in each transform block based on transform block setting information DS32 supplied from the transform block setting section 32, and outputs resulting transform coefficients DS3 to the first quantizing section 15.

The first quantizing section 15 quantizes the transform coefficients DS3 output from the first transform section 13, and outputs quantized data DS5 to the entropy coding section 17*b* and the processing selecting switch 18. In addition, the first quantizing section 15 quantizes the transform coefficients DS3 in each transform block on the basis of the transform block setting information DS32 supplied from the transform block setting section 32.

The second transform section 14 applies a DCT in a prediction direction based on prediction mode information DS20 from the predicting section 25 to the prediction error signal DS2 supplied from the processing selecting switch 12. In addition, the second transform section 14 performs a DCT in the prediction direction in each transform block based on the transform block setting information DS32 supplied from the transform block setting section 32, and outputs resulting transform coefficients DS4 to the second quantizing section 16.

The second quantizing section 16 quantizes the transform coefficients DS4 supplied from the second transform section 14 in the prediction direction on the basis of the prediction mode information DS20 from the predicting section 25, and outputs quantized data DS6 to the entropy coding section 17*b* and the processing selecting switch 18. In addition, the second quantizing section 16 quantizes the transform coefficients DS4 in each transform block on the basis of the transform block setting information DS32 supplied from the transform block setting section 32.

The entropy coding section 17*b* entropy-codes the quantized data DS5 supplied from the first quantizing section 15 or the quantized data DS6 supplied from the second quantizing section 16. In addition, the entropy coding section 17*b* entropy-codes the prediction mode information DS20 generated in the predicting section 25, the transform information DS40 generated in the coding control section 40, and motion vector information DS35 detected in the motion estimating section 35. The entropy coding section 17b outputs coded data DSC obtained by performing the entropy coding.

The processing selecting switch 18 selects an inverse transform method on the basis of the transform information DS40 supplied from the coding control section 40, and outputs the quantized data DS5 from the first quantizing section 15 to the first dequantizing section 19 and outputs the quantized data DS6 from the second quantizing section 16 to the second dequantizing section 20.

The first dequantizing section 19 dequantizes the quantized data DS5 supplied via the processing selecting switch 18. In addition, the first dequantizing section 19 dequantizes the quantized data in each transform block corresponding to that of the first quantizing section 15 on the basis of the transform block setting information DS32 supplied from the transform block setting section 32. The first dequantizing section 19 outputs transform coefficients DS11 obtained by performing the dequantization to the first inverse transform section 21.

The first inverse transform section 21 subjects the transform coefficients DS11 supplied from the first dequantizing section 19 to an inverse DCT in the horizontal and vertical directions which inverse DCT corresponds to the DCT in the horizontal and vertical directions in the first transform section 13. In addition, the first inverse transform section 21 performs an inverse DCT in the horizontal and vertical directions in each transform block based on the transform block setting information DS32 supplied from the transform block setting section 32. The first inverse transform section 21 outputs a prediction error signal DS13 obtained by performing the inverse DCT to the arithmetic section 23.

The second dequantizing section 20 dequantizes the quantized data DS6 supplied via the processing selecting switch 18. The second dequantizing section 20 performs dequantization in the prediction direction corresponding to that of the second quantizing section 16 on the basis of the prediction mode information DS20 from the predicting section 25. In addition, the second dequantizing section 20 dequantizes the quantized data in each transform block corresponding to that of the second quantizing section 16 on the basis of the transform block setting information DS32 supplied from the transform block setting section 32. The second dequantizing section 20 outputs transform coefficients DS12 obtained by performing the dequantization to the second inverse transform section 22.

The second inverse transform section 22 performs an inverse DCT of the transform coefficients DS12. The second inverse transform section 22 performs an inverse DCT in the prediction direction corresponding to that of the second transform section 14 on the basis of the prediction mode information DS20 from the predicting section 25. In addition, the second inverse transform section 22 performs an inverse DCT of the transform coefficients in each transform block corresponding to that of the second transform section 14 on the basis of the transform block setting information DS32 supplied from the transform block setting section 32. The second inverse transform section 22 outputs the prediction error signal DS14 obtained by performing the inverse DCT to the arithmetic section 23.

The arithmetic section 23 generates a reference image signal DS15 by adding the predicted image signal DS37 output from the prediction selecting switch 37 to the prediction error signal DS13 supplied from the first inverse transform section 21 or the prediction error signal DS14 supplied from the second inverse transform section 22. The arithmetic section 23 stores the generated reference image signal DS15 in the reference memory 24.

The reference memory 24 stores not only the image signal of blocks adjacent in the spatial direction but also images in the temporal direction, that is, images of a plurality of frames as reference images. Incidentally, the images of the plurality of frames are stored after being subjected to deblocking filter processing.

The image signal DS16 of the adjacent blocks which image signal is read from the reference memory 24 is supplied to the predicting section 25 and the image signal selecting switch 30. In addition, the image signal DS17 of the frame images which image signal is read from the reference memory 24 is supplied to the motion estimating section 35 and the motion compensating section 36.

The predicting section 25 performs intra-frame prediction in each prediction mode using the image signal DS16. In addition, the predicting section 25 determines a prediction mode that maximizes coding efficiency, and generates prediction mode information DS20 indicating the prediction mode that maximizes coding efficiency. The predicting section 25 outputs the generated prediction mode information DS20 to the second transform section 14, the second quantizing section 16, the entropy coding section 17b, the second dequantizing section 20, the second inverse transform section 22, and the transform block setting section 32. Further, the predicting section 25 generates a predicted image signal DS18 in the prediction mode that maximizes coding efficiency, and outputs the predicted image signal DS18 to the prediction selecting switch 37.

The image signal selecting switch 30 selects one of the image signal DS16 supplied from the reference memory 24 and a predicted image signal DS36 supplied from the motion compensating section 36 on the basis of the transform information DS40, and outputs the selected image signal to the reference image edge detecting section 31. For example, in a case of an intra-frame prediction mode, the image signal selecting switch 30 selects the image signal DS16 supplied from the reference memory 24, and outputs the selected image signal to the reference image edge detecting section 31. In a case of an inter-frame prediction mode, the image signal selecting switch 30 selects the predicted image signal DS36 supplied from the motion compensating section 36, and outputs the selected image signal to the reference image edge detecting section 31.

The reference image edge detecting section 31 detects an edge using the image signal selected by the image signal selecting switch 30, and outputs an index DS31 indicating the position of the edge and the intensity of the edge to the transform block setting section 32.

The transform block setting section 32 estimates the continuity of the edge within a sub-block as a coding object on the basis of the index DS31 supplied from the reference image edge detecting section 31 and the prediction mode information DS20 supplied from the predicting section 25. The transform block setting section 32 sets transform blocks in an orthogonal transform and quantization from a result of the estimation, and generates transform block setting information DS32 indicating the set transform blocks. The transform block setting section 32 outputs the generated transform block setting information DS32 to the first transform section 13, the second transform section 14, the first quantizing section 15, the second quantizing section 16, the first dequantizing section 19, the second dequantizing section 20, the first inverse transform section 21, and the second inverse transform section 22.

The motion estimating section 35 performs motion estimation in the sub-block and detects a motion vector using the input image signal DS1 and the image signal DS17 supplied from the reference memory 24. The motion estimating section 35 outputs motion vector information DS35 indicating the detected motion vector to the motion compensating section 36 and the entropy coding section 17b.

The motion compensating section 36 applies motion compensation based on the motion vector information DS35 supplied from the motion estimating section 35 to a reference image based on the image signal DS17 supplied from the reference memory 24. The motion compensating section 36 outputs a predicted image signal DS36 in an inter-frame prediction mode which image signal is generated by the motion compensation to the prediction selecting switch 37 and the image signal selecting switch 30.

The prediction selecting switch 37 selects one of the predicted image signal DS18 supplied from the predicting section 25 and the predicted image signal DS36 supplied from the motion compensating section 36 on the basis of the transform information DS40, and outputs the selected image signal to the arithmetic sections 11 and 23. For example, in a case of an intra-frame prediction mode, the prediction selecting switch 37 selects the predicted image signal DS18 supplied from the predicting section 25, and outputs the selected image signal as predicted image signal DS37 to the arithmetic sections 11 and 23. In a case of an inter-frame prediction mode, the prediction selecting switch 37 selects the predicted image signal DS36 supplied from the motion compensating section 36, and outputs the selected image signal as predicted image signal DS37 to the arithmetic sections 11 and 23.

The coding control section 40 generates transform information DS40. The transform information DS40 is information for selecting either a process of performing a horizontal and vertical DCT in relation to an orthogonal transform and horizontal and vertical quantization or a process of performing a one-dimensional DCT and quantization along a prediction direction indicated by the prediction mode information DS20. In addition, suppose that the transform information DS40 in the third embodiment indicates which of intra-frame prediction and inter-frame prediction is selected. The coding control section 40 outputs the generated transform information DS40 to the processing selecting switch 12, the entropy coding section 17b, the processing selecting switch 18, the image signal selecting switch 30 and the prediction selecting switch 37.

[3-2. Operation of Image Coding Device]

Figure 25:
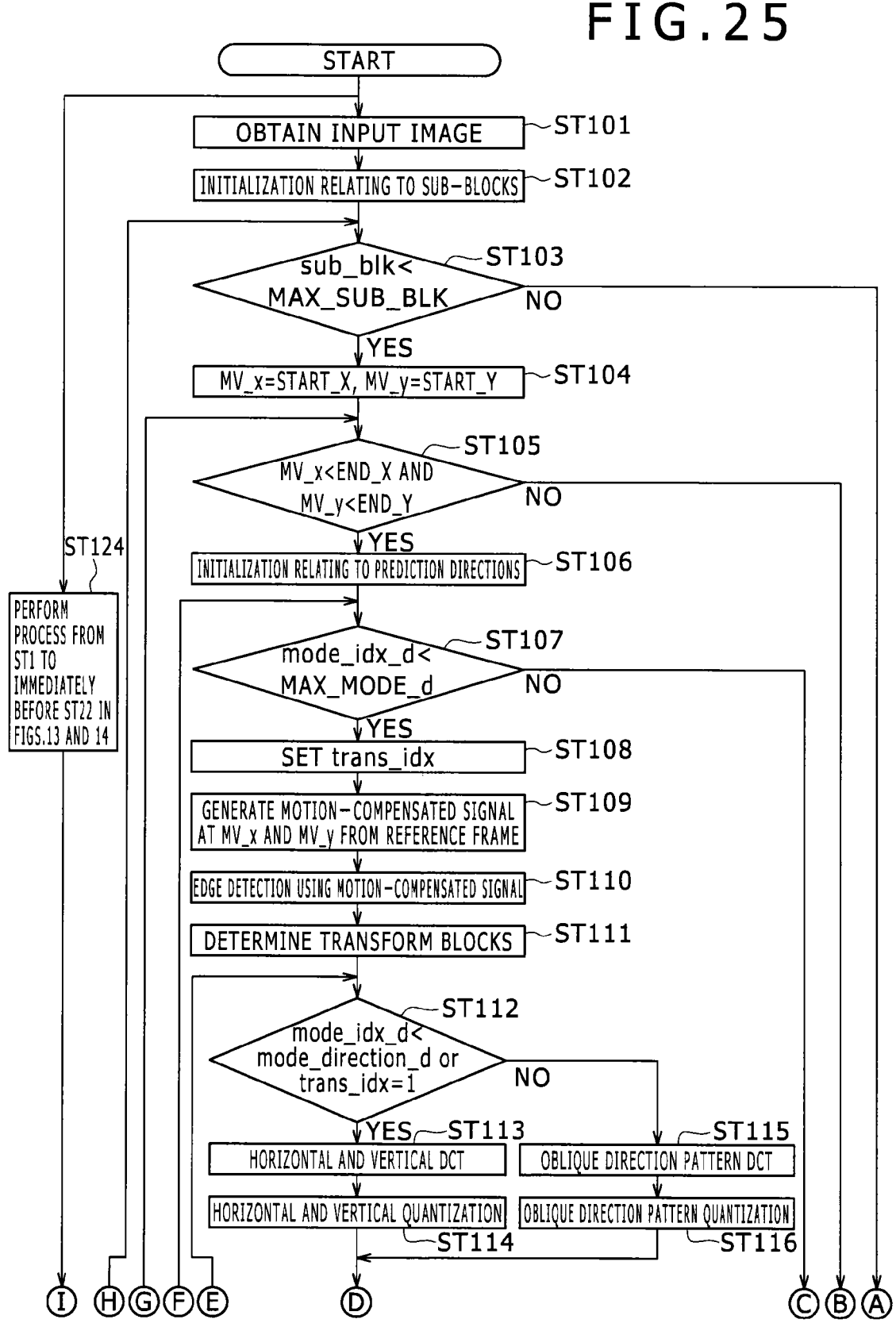
FIG. 25 is a flowchart (1/2) showing operation of the image coding device in the third embodiment.
Figure 26:
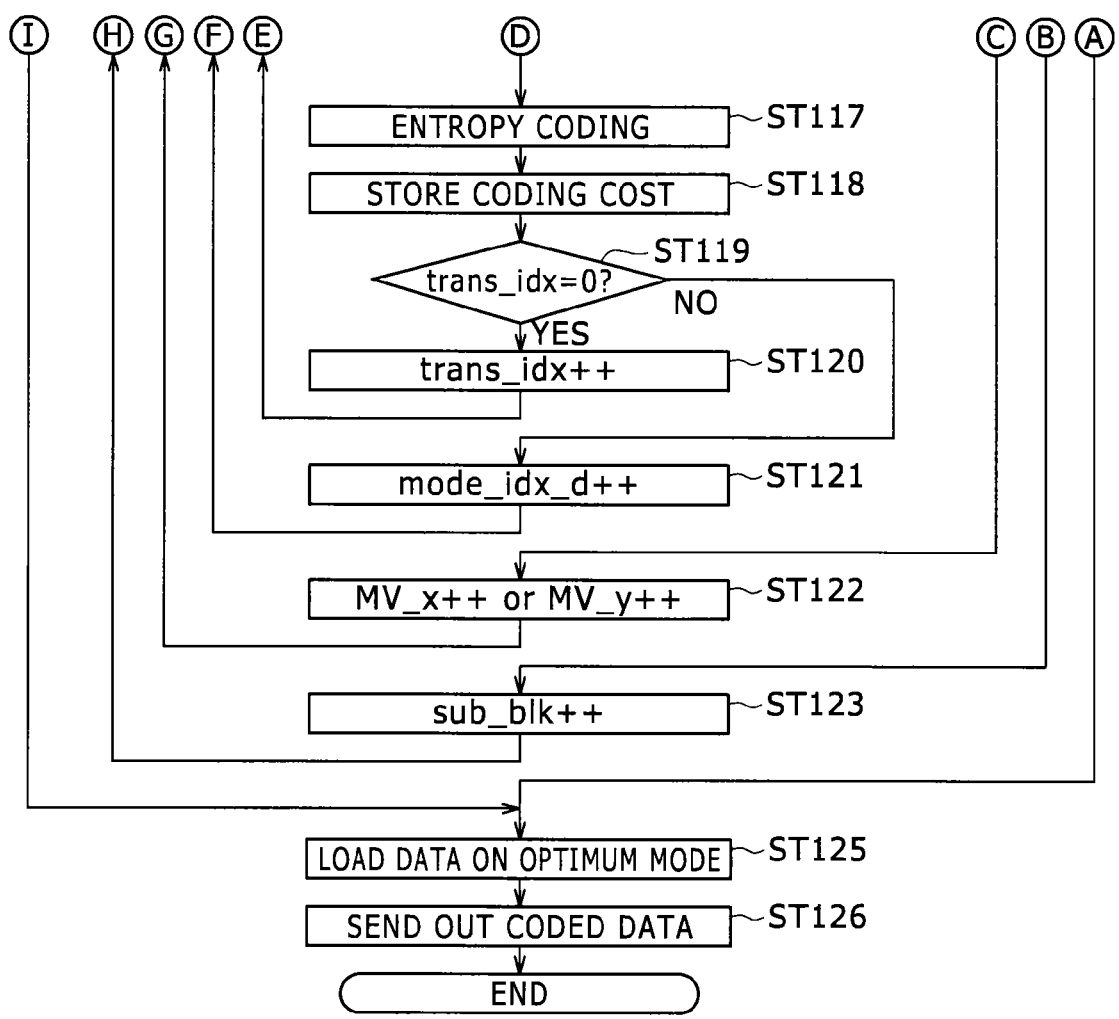
FIG. 26 is a flowchart (2/2) showing the operation of the image coding device in the third embodiment.

FIG. 25 and FIG. 26 are flowcharts of operation of the image coding device 10b in the third embodiment. In step ST101, the image coding device 10b obtains an input image. The image coding device 10b obtains an input image signal DS1, and starts coding in each macroblock or each macroblock pair.

In step ST102, the image coding device 10b performs initialization relating to sub-blocks. The image coding device 10b initializes a sub-block index sub_blk to "sub_blk=0" and sets a maximum sub-block number MAX_SUB_BLK at the same time. The image coding device 10b then proceeds to step ST103.

In step ST103, the image coding device 10b determines whether the sub-block index sub_blk is smaller than the maximum sub-block number MAX_SUB_BLK. When the sub-block index sub_blk is smaller than the maximum sub-block number MAX_SUB_BLK, there is a sub-block yet to be coded among sub-blocks within a macroblock, and therefore the image coding device 10b proceeds to step ST104. When the sub-block index sub_blk is not smaller than the maximum sub-block number MAX_SUB_BLK, there is no sub-block yet to be coded among the sub-blocks within the macroblock, and therefore the image coding device 10b proceeds to step ST125.

In step ST104, the image coding device 10b sets a motion vector search position MV_x in an X-direction (for example a horizontal direction) and a motion vector search position MV_y in a Y-direction (for example a vertical direction) to search start points START_X and START_Y. The image coding device 10b then proceeds to step ST105.

In step ST105, the image coding device 10b determines whether MV_x<END_X and MV_y<END_Y. When the search positions are within search ranges up to search end points END_X and END_Y, the image coding device 10b proceeds to step ST106. When the search positions exceed to the search ranges, the image coding device 10b proceeds to step ST123.

In step ST106, the image coding device 10b performs initialization relating to prediction directions. The image coding device 10b initializes an index mode_idx_d to "mode_idx_d=0," and sets a maximum selectable direction number MAX_MODE_d. The index mode_idx_d indicates a prediction direction, and corresponds to a prediction direction in an intra-frame prediction mode. The maximum direction number MAX_MODE_d corresponds to the number of selectable prediction directions, that is, the maximum mode number MAX_MODE of intra-frame prediction modes. Thus using the index mode_idx_d indicating a prediction direction makes it possible to perform DCTs corresponding to oblique prediction directions and detect an optimum mode also in inter-frame prediction.

In step ST107, the image coding device 10b determines whether the prediction direction index mode_idx_d is smaller than the maximum direction number MAX_MODE_d. When the prediction direction index mode_idx_d is smaller than the maximum direction number MAX_MODE_d, the image coding device 10b determines that not all prediction directions have been tried. The image coding device 10b then proceeds to step ST108. When the prediction direction index mode_idx_d is not smaller than the maximum direction number MAX_MODE_d, the image coding device 10b determines that all the prediction directions have been tried. The image coding device 10b then proceeds to step ST122.

In step ST108, the image coding device 10b sets transform information trans_idx. The image coding device 10b sets the transform information trans_idx according to the value of the prediction direction index mode_idx_d. For example, when the value of the prediction direction index mode_idx_d indicates an oblique prediction direction, the image coding device 10b sets the transform information trans_idx to "trans_idx=0." The image coding device 10b then proceeds to step ST109. When the value of the prediction direction index mode_idx_d indicates a non-oblique prediction direction, the image coding device 10b sets the transform information trans_idx to "trans_idx=1." The image coding device 10b then proceeds to step ST109.

In step ST109, the image coding device 10b generates a motion-compensated signal at the search positions MV_x and MV_y from a reference frame. The image coding device 10b then proceeds to step ST110.

In step ST110, the image coding device 10b detects an edge using the generated motion-compensated signal, and generates an index DS31 indicating the position of the edge and the intensity of the edge. The image coding device 10b then proceeds to step ST111.

In step ST111, the image coding device 10b sets transform blocks. The image coding device 10b estimates the continuity of the edge within the sub-block as the coding object on the basis of the index DS31 indicating the position of the edge and the intensity of the edge. Further, the image coding device 10b sets transform blocks on the basis of a result of the estimation of the continuity of the edge. The image coding device 10b then proceeds to step ST112.

In step ST112, the image coding device 10b determines whether the prediction direction index mode_idx_d is smaller than a minimum direction number mode_direction_d as a minimum index value of the oblique prediction directions, or whether the transform information is "trans_idx=1." In at least one of the cases where the prediction direction index mode_idx_d is smaller than the minimum direction number mode_direction_d and where the transform information is "trans_idx=1," the image coding device 10b proceeds to step ST113. Otherwise, the image coding device 10b proceeds to step ST115.

In step ST113, the image coding device 10b performs a horizontal and vertical DCT. The image coding device 10b then proceeds to step ST114. In step ST114, the image coding device 10b performs horizontal and vertical quantization. The image coding device 10b then proceeds to step ST117. The image coding device 10b for example changes the processing selecting switch 12 to the side of the first transform section 13, and performs the DCT and the quantization using the first transform section 13 and the first quantizing section 15.

In step ST115, the image coding device 10b performs an oblique direction pattern DCT. The image coding device 10b then proceeds to step ST116. In step ST116, the image coding device 10b performs oblique direction pattern quantization. The image coding device 10b then proceeds to step ST117. The image coding device 10b for example changes the processing selecting switch 12 to the side of the second transform section 14. In addition, the image coding device 10b changes a pattern selecting switch 140 in the second transform section 14 and a pattern selecting switch 160 in the second quantizing section 16 according to the prediction direction index mode_idx_d. The image coding device 10b performs the DCT and the quantization using an oblique direction pattern DCT section and an oblique direction pattern quantizing section corresponding to the prediction direction.

In step ST117, the image coding device 10b performs entropy coding. The image coding device 10b entropy-codes the quantized data DS5 and DS6, the prediction mode information DS20, the motion vector information DS35, and the transform information DS40 in the entropy coding section 17b. The image coding device 10b then proceeds to step ST118.

In step ST118, the image coding device 10b stores coding cost. The coding control section 40 in the image coding device 10b calculates a cost value K as described above, and stores the calculated cost value K. The image coding device 10b then proceeds to step ST119.

In step ST119, the image coding device 10b determines whether the transform information trans_idx is "trans_idx=0." When the transform information trans_idx is "trans_idx=0," the image coding device 10b proceeds to step ST120. When the transform information trans_idx is not "trans_idx=0," the image coding device 10b proceeds to step ST121.

In step ST120, the image coding device 10b adds "1" to the transform information trans_idx to set new transform information trans_idx. The image coding device 10b then returns to step ST112.

In step ST121, the image coding device 10b adds "1" to the prediction direction index mode_idx_d to set a new index mode_idx_d. The image coding device 10b then returns to step ST107.

When thereafter determining in step ST107 that the prediction direction index mode_idx_d is not smaller than the maximum direction number MAX_MODE_d and thus proceeding to step ST122, the image coding device 10b changes the search position MV_x or the search position MV_y to a new position. The image coding device 10b then returns to step ST105.

When the search positions exceed the search ranges in step ST105, the image coding device 10b proceeds to step ST123, where the image coding device 10b adds "1" to the sub-block index sub_blk to set a new index sub_blk.

The image coding device 10b then returns to step ST103. When determining in step ST103 that the sub-block index sub_blk is not smaller than the maximum sub-block number MAX_SUB_BLK, the image coding device 10b proceeds to step ST125.

The image coding device 10b performs not only the inter-frame prediction but also the intra-frame prediction described with reference to FIGS. 13 and 14 in step ST124. The image coding device 10b then proceeds to step ST125.

In step ST125, the image coding device 10b loads data on an optimum mode. The image coding device 10b compares stored coding costs with each other, and determines that a mode or a prediction direction providing highest coding efficiency in the intra-frame prediction and the inter-frame prediction is an optimum mode. The image coding device 10b loads data on the determined optimum mode. The image coding device 10b then proceeds to step ST126.

In step ST126, the image coding device 10b multiplexes and sends out coded data obtained by performing coding in the optimum mode in the macroblock. In addition, the image coding device 10b entropy-codes the prediction mode information DS20, that is, the index mode_idx of the optimum mode and the transform information DS40, that is, the transform information trans_idx, and includes the entropy-coded information in the coded data. Further, the image coding device 10b entropy-codes the motion vector information DS35 in the optimum mode, and includes the entropy-coded motion vector information DS35 in the coded data.

Figure 27A:
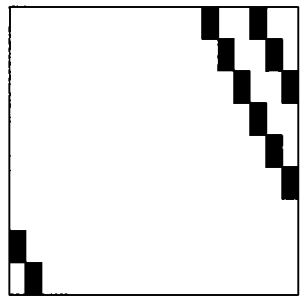
FIGS. 27A and 27B are diagrams of assistance in explaining edge detection using motion compensation.

In a case of intra-frame prediction, the reference image edge detecting section 31 of the image coding device 10b performs similar operation to that in the first embodiment. In a case of inter-frame prediction, the reference image edge detecting section 31 performs edge detection using a motion-compensated signal obtained by performing motion compensation as in MPEG or the H.264/AVC system. FIG. 27A shows edges detected by using a motion-compensated signal. The image coding device 10b performs edge detection using for example a Sobel filter as described above, and obtains indexes indicating the positions of the edges and the intensities of the edges.

In a case of intra-frame prediction, the transform block setting section 32 performs similar operation to that in the first embodiment. In a case of inter-frame prediction, the transform block setting section 32 sets transform blocks on the basis of an index indicating the position of an edge and the intensity of the edge in a motion-compensated signal.

Figure 27B:
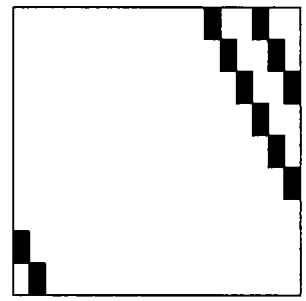

For example, when edges are detected as shown in FIG. 27A, the transform block setting section 32 estimates that the same edges are present in the sub-block as the coding object as shown in FIG. 27B, and sets transform blocks as in a case of intra-frame prediction on the basis of a result of the estimation.

[3-3. Configuration of Image Decoding Device]

Description will next be made of an image decoding device that decodes the coded data generated by the image coding device 10b.

Figure 28:
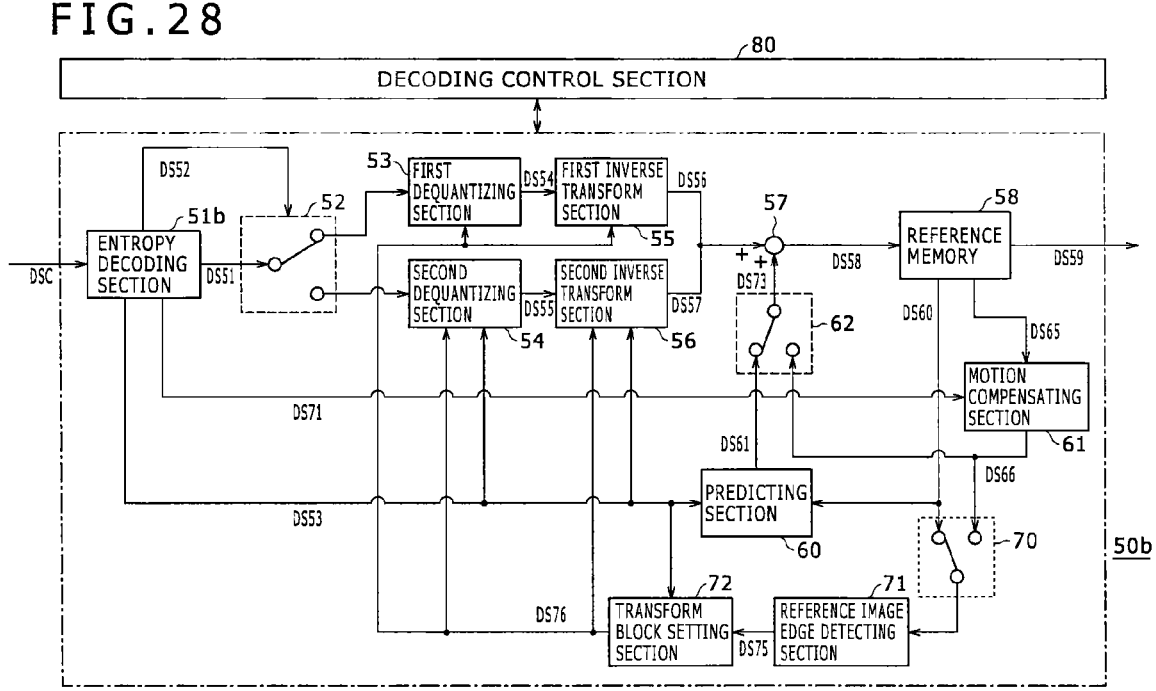
FIG. 28 is a diagram showing a configuration of an image decoding device in the third embodiment.

FIG. 28 shows a configuration of an image decoding device 50b in the third embodiment. Incidentally, in FIG. 28, constituent elements corresponding to those of the image decoding device 50 according to the first embodiment are identified by the same reference numerals.

The image decoding device 50b includes an entropy decoding section 51b, a processing selecting switch 52, a first dequantizing section 53, a second dequantizing section 54, a first inverse transform section 55, a second inverse transform section 56, an arithmetic section 57, a reference memory 58, a predicting section 60, a motion compensating section 61, and a prediction selecting switch 62. The image decoding device 50b also includes an image signal selecting switch 70, a reference image edge detecting section 71, a transform block setting section 72, and a decoding control section 80.

The entropy decoding section 51b entropy-decodes the coded data DSC received as input. The entropy decoding section 51b performs entropy decoding corresponding to the entropy coding performed in the entropy coding section 17b in the image coding device 10b. The entropy decoding section 51b outputs quantized data DS51 and transform information DS52 (corresponding to DS40) obtained by performing the entropy decoding to the processing selecting switch 52. The entropy decoding section 51b also outputs prediction mode information DS53 (corresponding to DS20) obtained by performing the entropy decoding to the second quantizing section 54, second inverse transform section 56, the predicting section 60 and the transform block setting section 72.

The processing selecting switch 52 performs switching on the basis of the transform information DS52 supplied from the entropy decoding section 51b to output the quantized data DS51 to the first dequantizing section 53 or the second dequantizing section 54.

The first dequantizing section 53 is configured in a similar manner to the first dequantizing section 19 in the image coding device 10b. The first dequantizing section 53 dequantizes the quantized data DS51 supplied via the processing selecting switch 52. In addition, the first dequantizing section 53 dequantizes the quantized data in each transform block based on transform block setting information DS76 supplied from the transform block setting section 72. The first dequantizing section 53 outputs transform coefficients DS54 obtained by performing the dequantization to the first inverse transform section 55.

The first inverse transform section 55 is configured in a similar manner to the first inverse transform section 21 in the image coding device 10b. The first inverse transform section 55 applies an inverse DCT in the horizontal and vertical directions to the transform coefficients DS54 supplied from the first dequantizing section 53 in each transform block based on the transform block setting information DS76 supplied from the transform block setting section 72. The first inverse transform section 55 outputs a prediction error signal DS56 obtained by performing the inverse DCT to the arithmetic section 57.

The second dequantizing section 54 is configured in a similar manner to the second dequantizing section 20 in the image coding device 10b. The second dequantizing section 54 dequantizes the quantized data DS51 supplied via the processing selecting switch 52. In addition, the second dequantizing section 54 dequantizes the quantized data in each transform block based on the transform block setting information DS76 supplied from the transform block setting section 72. The second dequantizing section 54 outputs transform coefficients DS55 obtained by performing the dequantization to the second inverse transform section 56.

The second inverse transform section 56 is configured in a similar manner to the second inverse transform section 22 in the image coding device 10b. The second inverse transform section 56 applies an inverse DCT according to a prediction direction to the transform coefficients DS55 supplied from the second dequantizing section 54 in each transform block based on the transform block setting information DS76 supplied from the transform block setting section 72. The second inverse transform section 56 outputs a prediction error signal DS57 obtained by performing the inverse DCT to the arithmetic section 57.

The arithmetic section 57 generates an image signal DS58 by adding a predicted image signal DS73 supplied from the prediction selecting switch 62 to the prediction error signal DS56 supplied from the first inverse transform section 55 or the prediction error signal DS57 supplied from the second inverse transform section 56. The arithmetic section 57 stores the generated image signal DS58 in the reference memory 58.

The reference memory 58 stores the image signal of adjacent blocks and the image signal of a plurality of frames. Incidentally, the image signal of the plurality of frames is stored after being subjected to deblocking filter processing.

The reference image signal DS60 of the adjacent blocks which image signal is read from the reference memory 58 is supplied to the predicting section 60 and the image signal selecting switch 70. In addition, the reference image signal DS65 of the frame images which image signal is read from the reference memory 58 is supplied to the motion compensating section 61.

The predicting section 60 performs prediction in the prediction mode indicated by the prediction mode information DS53 using the reference image signal DS60 read from the reference memory 58, generates a predicted image signal DS61, and supplies the predicted image signal DS61 to the prediction selecting switch 62.

When an inter-frame prediction mode is selected as an optimum mode, the motion compensating section 61 performs motion compensation using the reference image signal DS65 on the basis of motion vector information in the optimum mode, and generates a predicted image signal DS66. The motion compensating section 61 supplies the generated predicted image signal DS66 to the prediction selecting switch 62 and the image signal selecting switch 70.

When an intra-frame prediction mode is selected as an optimum mode, the prediction selecting switch 62 selects the predicted image signal DS61 generated in the predicting section 60, and outputs the predicted image signal DS61 as a predicted image signal DS73 to the arithmetic section 57. When an inter-frame prediction mode is selected as an optimum mode, the prediction selecting switch 62 selects the predicted image signal DS66 generated in the motion compensating section 61, and outputs the predicted image signal DS66 as the predicted image signal DS73 to the arithmetic section 57.

When an intra-frame prediction mode is selected as an optimum mode, the image signal selecting switch 70 selects the reference image signal DS60, and outputs the reference image signal DS60 to the reference image edge detecting section 71. When an inter-frame prediction mode is selected as an optimum mode, the image signal selecting switch 70 selects the predicted image signal DS66 generated in the motion compensating section 61, and outputs the predicted image signal DS66 to the reference image edge detecting section 71.

The reference image edge detecting section 71 is configured in a similar manner to the reference image edge detecting section 31 in the image coding device 10b. The reference image edge detecting section 71 detects an edge using the decoded image signal selected by the image signal selecting switch 70, and outputs an index DS75 indicating the position of the edge and the intensity of the edge to the transform block setting section 72.

The transform block setting section 72 is configured in a similar manner to the transform block setting section 32 in the image coding device 10b. The transform block setting section 72 estimates the continuity of the edge within the sub-block as a coding object on the basis of the index DS75 supplied from the reference image edge detecting section 71 and the prediction mode information DS53 supplied from the entropy decoding section 51b. The transform block setting section 72 sets transform blocks in an inverse orthogonal transform and dequantization from a result of the estimation, and generates the transform block setting information DS76 indicating the set transform blocks. The transform block setting section 72 outputs the generated transform block setting information DS76 to the first dequantizing section 53, the second dequantizing section 54, the first inverse transform section 55, and the second inverse transform section 56.

The decoding control section 80 issues control instructions in the process of decoding the coded data and the like.

[3-4. Operation of Image Decoding Device]

FIG. 29 is a flowchart of operation of the image decoding device 50b in the third embodiment. In step ST151, the image decoding device 50b obtains coded data. The image decoding device 50b obtains the coded data DSC, and starts decoding in each macroblock or each macroblock pair. The image decoding device 50b then proceeds to step ST152.

In step ST152, the image decoding device 50b performs entropy decoding. The image decoding device 50b decodes the variable-length code of each syntax of the coded data DSC, and reproduces quantized data DS51, transform information DS52, prediction mode information DS53, and motion vector information DS35. The image decoding device 50b then proceeds to step ST153.

In step ST153, the image decoding device 50b performs syntax analysis. The image decoding device 50b analyzes the syntaxes from the data obtained by performing the decoding. The image decoding device 50b then proceeds to step ST154.

In step ST154, the image decoding device 50b performs initialization relating to sub-blocks. The image decoding device 50b initializes a sub-block index sub_blk to "sub_blk=0" and sets a maximum sub-block number MAX_SUB_BLK at the same time. The image decoding device 50b then proceeds to step ST155.

In step ST155, the image decoding device 50b determines whether the sub-block index sub_blk is smaller than the maximum sub-block number MAX_SUB_BLK. When the sub-block index sub_blk is smaller than the maximum sub-block number MAX_SUB_BLK, there is a sub-block yet to be decoded among sub-blocks within a macroblock, and therefore the image decoding device 50b proceeds to step ST156. When the sub-block index sub_blk is not smaller than the maximum sub-block number MAX_SUB_BLK, there is no sub-block yet to be decoded among the sub-blocks within the macroblock, and therefore the image decoding device 50b proceeds to step ST170.

In step ST156, the image decoding device 50b determines whether inter-frame prediction is selected. When inter-frame prediction is selected as an optimum mode, the image decoding device 50b proceeds to step ST157. When intra-frame prediction is selected, the image decoding device 50b proceeds to step ST169.

In step ST157, the image decoding device 50b loads a prediction direction index mode_idx_d, transform information trans_idx, and motion vector information. The image decoding device 50b extracts the prediction direction index mode_idx_d, the transform information trans_idx, and the motion vector information from the coded data. The image decoding device 50b then proceeds to step ST158.

In step ST158, the image decoding device 50b generates a motion-compensated signal. The image decoding device 50b generates the motion-compensated signal of search positions MV_x and MV_y indicated by the motion vector of the motion vector information DS35 on the basis of the image signal of a reference frame and the motion vector information DS35. The image decoding device 50b then proceeds to step ST159.

In step ST159, the image decoding device 50b detects an edge. The image decoding device 50b detects an edge using the generated motion-compensated signal, and generates an index DS75 indicating the position of the edge and the intensity of the edge. The image decoding device 50b then proceeds to step ST160.

In step ST160, the image decoding device 50b sets transform blocks. The image decoding device 50b sets transform blocks from the continuity of the edge within the sub-block as a decoding object on the basis of the index DS75 indicating the position of the edge and the intensity of the edge. The image decoding device 50b then proceeds to step ST161.

In step ST161, the image decoding device 50b determines whether the index mode_idx_d is smaller than a minimum mode number mode_direction_d of oblique direction prediction modes as a minimum value of the mode numbers of the oblique prediction direction modes, or whether the transform information is "trans_idx=1." In at least one of the cases where the prediction direction index mode_idx_d is smaller than the minimum mode number mode_direction_d and where the transform information is "trans_idx=1," the image decoding device 50b proceeds to step ST162. Otherwise, the image decoding device 50b proceeds to step ST164.

In step ST162, the image decoding device 50b performs horizontal and vertical dequantization. The image decoding device 50b then proceeds to step ST163. In step ST163, the image decoding device 50b performs a horizontal and vertical inverse DCT. The image decoding device 50b then proceeds to step ST166. The image decoding device 50b for example changes the processing selecting switch 52 to the side of the first dequantizing section 53, and performs the dequantization and the inverse DCT using the first dequantizing section 53 and the first inverse transform section 55.

In step ST164, the image decoding device 50b performs oblique direction pattern dequantization. The image decoding device 50b then proceeds to step ST165. In step ST165, the image decoding device 50b performs an oblique direction pattern inverse DCT. The image decoding device 50b then proceeds to step ST166. The image decoding device 50b for example changes the processing selecting switch 52 to the side of the second dequantizing section 54. In addition, the image decoding device 50b changes pattern selecting switches in the second dequantizing section 54 and the second inverse transform section 56 according to the prediction direction index mode_idx_d. By changing the switches according to the index mode_idx_d, the image decoding device 50b performs the dequantization and the inverse DCT using an oblique direction pattern dequantizing section and an oblique direction pattern inverse DCT section corresponding to the prediction direction.

In step ST166, the image decoding device 50b synthesizes a prediction error and a predicted image. The image decoding device 50b generates an image signal DS58 by adding a predicted image signal DS73 supplied from the prediction selecting switch 62 to a prediction error signal DS56 or a prediction error signal DS57. The image decoding device 50b then proceeds to step ST167.

In step ST167, the image decoding device 50b stores the generated image signal DS58 in the reference memory. The image decoding device 50b stores the generated image signal DS58 in the reference memory 58. The image decoding device 50b then proceeds to step ST168.

In step ST168, the image decoding device 50b adds "1" to the sub-block index sub_blk to set a new index sub_blk. The image decoding device 50b then returns to step ST155.

When determining in step ST156 that intra-frame prediction is selected and thus proceeding to step ST169, the image decoding device 50b performs a process from step ST56 to step ST67 in FIG. 20. The image decoding device 50b then returns to step ST155.

Thereafter, the image decoding device 50b determines in step ST155 that the sub-block index sub_blk is not smaller than the maximum sub-block number MAX_SUB_BLK. The image decoding device 50b then proceeds to step ST170. In step ST170, the image decoding device 50b outputs an image signal stored in the reference memory 58 after completion of the decoding of the sub-blocks as the image signal of a decoded image.

Thus, according to the third embodiment, transform blocks are set in consideration of edge continuity on the basis of not only intra-frame prediction but also inter-frame prediction. Thus, also in inter-frame prediction, it is possible to prevent a continuous edge from straddling a plurality of transform blocks and thus improve subjective image quality. In addition, transform blocks not including an edge are increased, so that energy concentration can be improved.

Incidentally, the third embodiment calculates coding cost for each prediction direction while changing the search positions in order. However, it is also possible for example to detect a block position having highest correlation with a sub-block as a coding object, calculate coding cost for each prediction direction at the block position having the highest correlation, compare the calculated coding cost for each prediction direction with coding cost for each prediction mode of intra-frame prediction, and determine an optimum mode. In this case, operation processing can be reduced because there is no need to calculate coding cost each time the search positions are changed in order.

In addition, the series of processes described in the specification can be performed by hardware, software, or a composite configuration of both hardware and software. When processing is performed by software, a program in which a processing sequence is recorded is executed after being installed into a memory within a computer incorporated in dedicated hardware. Alternatively, the program can be executed after being installed on a general-purpose computer capable of performing various kinds of processing.

For example, the program can be recorded on a hard disk or a ROM (Read Only Memory) as a recording medium in advance. Alternatively, the program can be stored (recorded) temporarily or permanently on a removable recording medium such as a flexible disk, a CD-ROM (Compact Disc Read Only Memory), an MO (Magneto-Optical) disk, a DVD (Digital Versatile Disc), a magnetic disk, a semiconductor memory, or the like. Such a removable recording medium can be provided as so-called packaged software.

Incidentally, in addition to being installed from a removable recording medium as described above onto a computer, the program is transferred by radio from a download site to a computer or transferred by wire to a computer via networks such as a LAN (Local Area Network), the Internet, and the like. The computer can receive the program transferred in such a manner, and install the program onto a recording medium such as a built-in hard disk or the like.

It is to be noted that the various kinds of processing described in the specification may be not only performed in time series according to the description but also performed in parallel or individually according to the processing power of a device performing the processing or according to necessity. In addition, a system in the present specification is a logical set configuration of a plurality of devices, and is not limited to a system in which devices of respective configurations are present within an identical casing.

In addition, the foregoing embodiments use a DCT as an orthogonal transform method, but may use a KLT (Karhunen-Loeve transform), a DST (discrete sine transform), or a DWT (discrete wavelet transform). In addition, block size is not limited to sizes in the foregoing embodiments, but may be larger block sizes.

The foregoing embodiments disclose the present technology in an illustrative form. It is obvious that modifications and substitutions in the embodiments can be made by those skilled in the art without departing from the spirit of the present technology. That is, in order to determine the spirit of the present technology, claims are to be considered.

According to an image coding device, an image decoding device, methods thereof, and programs according to an embodiment of the present technology, an edge is detected using the image signal of a reference image for a coding object block. On the basis of a result of the edge detection, transform blocks are set by dividing the coding object block such that boundaries between the blocks after the division do not include the edge. In addition, transform processing is performed for each transform block, and coded data is generated. The image decoding device decoding the coded data detects the edge using the image signal of the reference image for a decoding object block. On the basis of a result of the edge detection, transform blocks are set by dividing the decoding object block such that boundaries between the blocks after the division do not include the edge. In addition, inverse transform processing is performed for each transform block, and the image signal of a decoded image is generated. It is therefore possible to prevent a continuous edge from straddling a plurality of transform blocks and thus improve subjective image quality. In addition, transform blocks not including an edge can be increased, so that an effect of improving efficiency of energy concentration can be obtained. Thus, the present technology is suitable for imaging devices that generate moving images and still images, editing devices that edit moving images and still images, and the like.

The present application contains subject matter related to that disclosed in Japanese Priority Patent Application JP 2011-027385 filed in the Japan Patent Office on Feb. 10, 2011, the entire content of which is hereby incorporated by reference.

What is claimed is:

1. An image processing device comprising:
   circuitry configured to
      set (i) a size of each of a plurality of transform blocks within a block according to an edge in an image such that the size of one of the transform blocks within the block is different from the size of another transform block within the block divided from a block of the image and
      (ii) boundaries of the transform blocks such that the edge does not fall on the boundaries between the transform blocks; and
      transform the image according to the transform blocks.
2. The imaging processing device according to claim 1, wherein the circuitry is configured to set a number of the transform blocks within the block according to the edge.
3. The image processing device according to claim 1, wherein the circuitry is configured to select the edge to not fall on the boundaries between the transform blocks according to an intensity of the edge.
4. The image processing device according to claim 3, wherein the intensity of the edge is greater than other edges in the image.
5. The image processing device according to claim 1, wherein the circuitry is configured to set the size of each of the transform blocks by dividing the block according to the edge.
6. The image processing device according to claim 1, wherein
   the circuitry is configured to set the size of each of the transform blocks by dividing the block according to the edge such that a number of edges in the image straddling a plurality of the transform blocks is reduced.
7. The image processing device according to claim 1, wherein the circuitry is configured to set the size of each of the transform blocks by dividing the block according to the edge such that the edge is prevented from straddling a plurality of the transform blocks.
8. The image processing device according to claim 1, wherein the circuitry is configured to set the size of each of the transform blocks by dividing the block according to the edge such that a number of the transform blocks not including the edge increases.
9. The image processing device according to claim 1, wherein the block according to the edge includes at least three transform blocks, and
   each of the at least three transform blocks is set to a different size.
10. The imaging processing device according to claim 1, wherein the block according to the edge is divided into the transform blocks in only one of a horizontal direction or a vertical direction.
11. The imaging processing device according to claim 1, wherein a shape of one of the transform blocks is rectangular and not square.
12. An image processing method comprising:
    setting, by circuitry of an image processing device, (i) a size of each of a plurality of transform blocks within a block according to in an image such that the size of one of the transform blocks within the block is different from the size of another transform block within the block divided from a block of the image and
    (ii) boundaries of the transform blocks such that the edge does not fall on the boundaries between the transform blocks; and
    transforming, by the circuitry, the image according to the transform blocks.
13. The image processing method according to claim 12, further comprising:
    selecting the edge to not fall on the boundaries between the transform blocks according to an intensity of the edge.
14. The image processing method according to claim 13, wherein the intensity of the edge is greater than other edges in the image.
15. A non-transitory computer-readable medium storing computer-readable instructions thereon which when executed by a computer cause the computer to perform a method, the method comprising:
    setting (i) a size of each of a plurality of transform blocks within a block according to in an image such that the size of one of the transform blocks within the block is different from the size of another transform block within the block divided from a block of the image and
    (ii) boundaries of the transform blocks such that the edge does not fall on the boundaries between the transform blocks; and
    transforming the image according to the transform blocks.
16. The non-transitory computer-readable medium according to claim 15,
    wherein the method further comprises selecting the edge to not fall on the boundaries between the transform blocks according to an intensity of the edge.
17. The non-transitory computer-readable medium according to claim 16,
    wherein the intensity of the edge is greater than other edges in the image.

* * * * *

UNITED STATES PATENT AND TRADEMARK OFFICE
CERTIFICATE OF CORRECTION

PATENT NO. : 9,852,521 B2
APPLICATION NO. : 14/808554
DATED : December 26, 2017
INVENTOR(S) : Kazuhiro Shimauchi et al.

It is certified that error appears in the above-identified patent and that said Letters Patent is hereby corrected as shown below:

In the Claims

Claims 1-12, should read:

Claim 1: An image processing device comprising:
 circuitry configured to
  set (i) a size of each of a plurality of transform blocks within a block according to an edge in an image such that the size of one of the transform blocks within the block is different from the size of another transform block within the block divided from a block of the image and (ii) boundaries of the transform blocks such that the edge does not fall on the boundaries between the transform blocks; and
  transform the image according to the transform blocks.

Claim 2: The imaging processing device according to claim 1,
 wherein the circuitry is configured to set a number of the transform blocks within the block according to the edge.

Claim 3: The image processing device according to claim 1,
 wherein the circuitry is configured to select the edge to not fall on the boundaries between the transform blocks according to an intensity of the edge.

Claim 4: The image processing device according to claim 1,
 wherein the circuitry is configured to set the size of each of the transform blocks by dividing the block according to the edge.

Claim 5: The image processing device according to claim 1, wherein
 the circuitry is configured to set the size of each of the transform blocks by dividing the block according to the edge such that a number of edges in the image straddling a plurality of the transform blocks is reduced.

Signed and Sealed this
Thirtieth Day of April, 2019

Andrei Iancu
*Director of the United States Patent and Trademark Office*

Claim 6: The image processing device according to claim 1,
   wherein the circuitry is configured to set the size of each of the transform blocks by dividing the block according to the edge such that the edge is prevented from straddling a plurality of the transform blocks.

Claim 7: The image processing device according to claim 1,
   wherein the circuitry is configured to set the size of each of the transform blocks by dividing the block according to the edge such that a number of the transform blocks not including the edge increases.

Claim 8: The image processing device according to claim 1,
   wherein the block according to the edge includes at least three transform blocks, and each of the at least three transform blocks is set to a different size.

Claim 9: The imaging processing device according to claim 1,
   wherein the block according to the edge is divided into the transform blocks in only one of a horizontal direction or a vertical direction.

Claim 10: The imaging processing device according to claim 1,
   wherein a shape of one of the transform blocks is rectangular and not square.

Claim 11: An image processing method comprising:
   setting, by circuitry of an image processing device, (i) a size of each of a plurality of transform blocks within a block according to an edge in an image such that the size of one of the transform blocks within the block is different from the size of another transform block within the block divided from a block of the image and (ii) boundaries of the transform blocks such that the edge does not fall on the boundaries between the transform blocks; and
   transforming, by the circuitry, the image according to the transform blocks.

Claim 12: A non-transitory computer-readable medium storing computer-readable instructions thereon which when executed by a computer cause the computer to perform a method, the method comprising:
   setting (i) a size of each of a plurality of transform blocks within a block according to an edge in an image such that the size of one of the transform blocks within the block is different from the size of another transform block within the block divided from a block of the image and (ii) boundaries of the transform blocks such that the edge does not fall on the boundaries between the transform blocks; and
   transforming the image according to the transform blocks.